(12) United States Patent
Kuijk et al.

(10) Patent No.: US 7,564,899 B2
(45) Date of Patent: Jul. 21, 2009

(54) MULTISTAGE TUNING-TOLERANT EQUALIZER FILTER

(75) Inventors: Maarten Kuijk, Berchem-Antwerpen (BE); Xavier Maillard, Pepingen (BE)

(73) Assignee: Vrije Universiteit Brussel, Brussel (BE)

( * ) Notice: Subject to any disclaimer, the term of this patent is extended or adjusted under 35 U.S.C. 154(b) by 590 days.

(21) Appl. No.: 11/346,226

(22) Filed: Feb. 3, 2006

(65) Prior Publication Data
US 2006/0182171 A1     Aug. 17, 2006

Related U.S. Application Data

(63) Continuation-in-part of application No. 11/177,339, filed on Jul. 11, 2005.

(30) Foreign Application Priority Data

Feb. 4, 2005     (EP)     ................... 05447018

(51) Int. Cl.
H03H 7/30      (2006.01)
H03H 7/40      (2006.01)
H03K 5/159    (2006.01)
H03G 5/00      (2006.01)

(52) U.S. Cl. ........................ 375/232; 375/229; 375/233; 381/103

(58) Field of Classification Search ................ 375/229, 375/232; 333/18, 28; 381/103; 708/323
See application file for complete search history.

(56) References Cited

U.S. PATENT DOCUMENTS

| | | | | |
|---|---|---|---|---|
| 4,273,963 | A * | 6/1981 | Seidel | ........................ 379/398 |
| 4,714,846 | A * | 12/1987 | Pesque et al. | ................ 310/317 |
| 5,841,810 | A | 11/1998 | Wong et al. | |
| 6,304,615 | B1 | 10/2001 | Webster | |
| 2002/0034221 | A1 | 3/2002 | Webster | |
| 2003/0214353 | A1* | 11/2003 | Yoon | ........................... 330/69 |
| 2004/0229586 | A1* | 11/2004 | Oshima et al. | ........... 455/240.1 |
| 2005/0270092 | A1* | 12/2005 | Bailey et al. | .................... 330/9 |
| 2006/0098727 | A1* | 5/2006 | Kuijk | ......................... 375/232 |

FOREIGN PATENT DOCUMENTS

| | | |
|---|---|---|
| EP | 1 392 001 | 2/2004 |
| WO | WO 03/050967 | 6/2003 |
| WO | WO 2004/073274 | 8/2004 |

* cited by examiner

Primary Examiner—David C Payne
Assistant Examiner—Brian J Stevens
(74) Attorney, Agent, or Firm—Bacon & Thomas, PLLC

(57) ABSTRACT

A multistage equalizer filter for compensating a received distorted signal having an amplitude for frequency dependent signal modifications introduced by a transmission channel includes at least one amplifying compensation stage having a gain and a saturation level, the gain being monotonically rising for at least a last decade in frequency below an upper data frequency of the received signal, and a gain control device for controlling the gain of the amplifying compensation stage such that the amplitude of the received signal amplified in the at least one amplifying compensation stage remains below the saturation level of the amplifying compensation stage. The gain may be regulated by separately regulating low frequency gain, mid-frequency gain and higher frequency gain for each of the at least one amplifying compensation stages.

4 Claims, 29 Drawing Sheets

MULTISTAGE TUNING-TOLERANT EQUALIZER FILTER

This application is a continuation-in-part of application Ser. No. 11/177,339, filed Jul. 11, 2005.

TECHNICAL FIELD OF THE INVENTION

The present invention relates to the field of data communication. More particularly, the present invention relates to devices and corresponding methods for multistage equalizer filtering in a line equalizer system, which restore the attenuated signals transmitted over a communication or transmission channel for a wide variety of communication or transmission channels with an acceptable amount of jitter. The present invention also relates to the use of the equaliser in communications system, e.g. in a modem.

BACKGROUND OF THE INVENTION

An equalizer system in general compensates frequency dependent losses that a signal experiences when passing through a transmission channel. Transmission channels include, but are not limited to, a wire, a pair of wires, an optical fibre, the reading and writing channels of a storage device like a hard-disc or optical disc, a wireless connection such as a point-to-point or diffuse infra-red or radio connection. A pair of wires includes a twisted pair, a twinax coax or a differential transmission line on a printed circuit board.

The compensation level of an equalizer system in general can be self-adaptive, fixed or programmable e.g. by a voltage or via a set of switches. A self-adaptive equalizer system continuously estimates the matching compensation level. It typically includes an adaptable filter, a control loop and an output reconstruction unit.

EP-1392001 describes how to organise a control loop in an equalizer system such that self-adaptation is achieved, independently from the transmit amplitude and the transmitted bit pattern. A feed-back control signal is generated from the equalised output of an equalizer filter. Depending on whether the output signal has been under- or over-compensated, the feed-back control signal increases or decreases, such that after a reasonable time the feed-back control signal converges to a value where matched compensation is reached. The control loop is formed by a first means for measuring a short-term-amplitude signal of the output signal, a second means for measuring a long-term-amplitude signal of the output signal and a comparator means for comparing the short-term-amplitude signal and the long-term-amplitude signal, and for determining the evolution of the feed-back control signal.

U.S. Pat. No. 5,841,810 describes a way to arrange multiple adaptive filter stages in an adaptive filter. The plurality of filter stages have a common equalisation control signal that has a magnitude that corresponds to the communications path transfer function, with each adaptive filter stage transfer function being an approximate inverse of a transfer function that corresponds to a portion of the input data signal communications path. The compensation thus is based on the ideal transfer function of the communications path.

U.S.-2002/0034221 discloses a communications receiver that has multiple stages each having a transfer function $1+K_i [f_i(j\omega)]$, wherein the $K_i$ vary with a sequential gain control methodology. This document thus teaches to compensate by making a sum per stage of the unity input signal linearly added to a function that has higher frequency gain. This known method makes multiple tuning signals in circuitry using many comparators and is relative complex. It is not suited for low voltage operation nor for implementation on a small chip area using small transistors that have large input offset mismatches.

WO 2004/073274 describes how to organise an adaptive equalizer filter with multiple stages that can operate at low-voltage, and whereby the stage that is being tuned can operate in a non-linear way, still giving sufficient restoration of a transmitted digital data signal. Multiple tuning circuits generate tuning signals. Each tuning signal can typically induce higher frequency gain up to a limited level, e.g. +5 dB, at the upper data frequency for compensation of high frequency losses in the connected transmission channel. Several tuning signals can tune one adaptive amplifying compensation stage. In its adaptive amplifying compensation stage the tuning signal can generate through its tuning function, non-linear small-signal and large-signal transfer behaviour. However, by limiting the amount of higher frequency gain to maximum +8 dB per tuning function, and by having only one tuning function active at a time the resulting deterministic jitter remains tolerable.

A difficulty with the above-mentioned state-of-the-art adaptive and self-adaptive equalizer filters and systems is that they estimate the losses in the channel and then compensate these losses by matched complementary amplification. The precision with which this loss-level is being estimated and with which the compensation is being set, largely determines the quality of the restored bit-stream at the output of the adaptive equalizer filter in terms of achieved jitter performance.

The above-described prior art adaptive and self-adaptive equalizer filters only teach how a multi-stage equalizer system can be conceived that compensates signal modifications introduced by a transmission channel for a limited number of different types and lengths of transmission channels.

SUMMARY OF THE INVENTION

It is an object of the present invention to provide equalizing filtering apparatus and methods allowing compensation of signal modifications introduced by a transmission channel for a large variety of transmission channels. The above objective is accomplished by a method and device according to the present invention.

In a first aspect, the invention relates to an equalizer filter for compensating a received distorted signal for frequency dependent signal modifications introduced by a transmission channel, the received signal having an amplitude, the filter comprising at least one amplifying compensation stage having a gain and a saturation level, the gain being monotonically rising for at least a last decade in frequency below an upper data frequency of the received signal, and gain control means for controlling the gain of the amplifying compensation stage, such that the amplitude of the received signal amplified in the at least one amplifying compensation stage remains below the saturation level of the amplifying compensation stage. The at least one amplifying compensation stage may preferably be at least two compensation stages. The equalizer filter may allow for overcompensation up to 3 dB, preferably up to 10 dB, more preferably up to 20 dB. The equalizer filter may allow for compensation up to 30 dB. The upper data frequency may be at least half the data bandwidth, preferably 60% of the data bandwidth, more preferably 70% of the data bandwidth.

In the equalizer filter, each of the at least one amplifying compensation stage may be provided for receiving at least one gain control signal wherein the gain control means may comprise at least one gain regulating circuit for providing at least one gain control signal to each of said at least one amplifying compensation stage. The gain control means may furthermore comprise a feed-back connection between the output node of an amplifying compensation stage and the gain regulating circuit for providing feed-back to said gain regulating circuit. The amplifying compensation stage may be the one that is reached the latest by the signal.

Alternatively, the operation of the gain regulating circuit may be based on a replica biasing technique. The gain regulating circuit may comprise a replica of the amplifying compensation stage(s) for which it provides a gain control signal.

The gain control signals may be provided in parallel to each of the at least one amplifying compensation stage(s). The gain control means may furthermore comprise a second gain regulating circuit, to sequentially turn ON higher frequency gain function circuits of said at least one amplifying compensation stage(s) until matching compensation is obtained. The gain control means may furthermore also comprise a second gain regulating circuit, to sequentially turn ON higher frequency gain function circuits of said at least one amplifying compensation stage(s) until overcompensation is reached as a target compensation level. The gain control means may furthermore comprise a third gain regulating circuit, to sequentially turn ON mid-frequency gain function circuits of the at least one amplifying compensation stages, until optimum compensation is reached. The mid-frequency gain function circuits of said at least one amplifying compensation stages allow for compensation in a frequency band between $\frac{1}{20}$ and $\frac{1}{2}$ of the upper data frequency.

One or more gain control signals may be used per gain function circuit, e.g. two gain control signals may be used for the higher-frequency gain function circuit, two gain control signals may be used for the mid-frequency gain function circuit, and a single gain control signal may be used for the low-frequency gain control circuit. Tuning circuits may be provided to organise how the gain control signals are turned ON, i.e. to organise which gain control signals get a first binary value, which ones get a second binary value and which ones get an intermediate value. The gain control signals may e.g. be turned ON sequentially, e.g. following a neighbour triggering method as explained in WO 2004/073274. There is no limit in the number of gain control signals per compensation stage.

The gain control means may furthermore comprise a feed-forward circuit, to determine how many of the available at least one amplifying compensation stages need to be turned ON to obtain optimum compensation.

An equalizer filter according to the present invention may further comprise a limiting amplifier for amplifying and/or saturating the output of the last amplifying compensation stage. An equalizer filter may furthermore comprise a comparator means for comparing differential outputs of a first and a second filter coupled to the output node of the last amplifying compensation stage and to the output node o the equalizer filter. The first and the second filters may be low-pass filters, band-pass filters or high-pass filters. The comparator means may be adapted for generating a comparator signal for adjusting the higher frequency gain of the at least one amplifying compensation stage. Alternatively, the comparator means may be adapted for generating a comparator signal for adjusting the mid-frequency gain of the at least one amplifying compensation stages.

In a second aspect, the invention also relates to an equalizer system for compensating a received distorted signal for frequency dependent signal modifications introduced by a transmission channel, said equalizer system comprising an equalizer filter according to the present invention as described above with respect to the first aspect. Thus, the invention relates to an equalizer filter as described above incorporated in an equalizer system for compensating a received distorted signal for frequency dependent signal modifications introduced by a transmission channel.

In a third aspect, the invention also relates to a method for compensating a distorted signal for frequency dependent signal modifications introduced by a transmission channel, the signal having an amplitude, the method comprising receiving a distorted signal, compensating said distorted signal and outputting a compensated signal, whereby compensating comprises providing a gain which is monotonically rising for at least a last decade in frequency below an upper data frequency of the received distorted signal, the gain being adapted so as to keep the amplitude of the signal below a saturation level of each of at least one amplifying compensation stage, and amplifying the received signal in the at least one amplifying compensation stage using the provided gain. The compensating may allow overcompensating up to 3 dB, preferably up to 10 dB, more preferably up to 20 dB. The compensating may allow for a compensation up to 30 dB.

The upper data frequency may be at least half the data bandwidth, preferably 60% of the data bandwidth, more preferably 70% of the data bandwidth.

The compensating may be performed in at least one amplifying compensation stage, wherein providing a gain comprises providing a gain control signal in parallel to each of said at least one amplifying compensation stages. The compensating preferably may be performed in at least two amplifying compensation stages.

Providing a gain may comprise determining a gain based on a replica biasing technique.

Amplifying the received signal may comprise sequentially turning ON higher frequency gain function circuits of said at least one amplifying compensation stage until optimum compensation is obtained. Alternatively, amplifying the received signal may comprise sequentially turning ON higher frequency gain function circuits of said at least one amplifying compensation stage until overcompensation as a target compensation level is obtained. Amplifying the received signal may furthermore comprise sequentially turning ON mid-frequency gain function circuits of said at least one amplifying compensation stage until optimum compensation is obtained. Alternatively, amplifying the received signal may furthermore comprise sequentially turning ON mid-frequency gain function circuits of said at least one amplifying compensation stage until overcompensation as a target compensation level is obtained.

Amplifying the received signal may furthermore comprise determining how many of the available at least one amplifying compensation stages need to be turned ON using a feed-forward loop to obtain an optimum compensation.

When there is a last amplifying compensation stage under the at least one amplifying compensation stages, a method according to the present invention may furthermore comprise amplifying and/or saturating an output of the last amplifying compensation stage.

When there is a last amplifying compensation stage under the at least one amplifying compensation stages and when the compensated signal is output to an output node of an equalizer filter, a method according to the present invention may furthermore comprise comparing differential outputs of a first signal on an output node of the last amplifying compensation stage and of a second signal on the output node of the equalizer filter. Before comparing the differential outputs, the first signal may be filtered on the output node of the last amplifying compensation stage and the second signal may be filtered on the output node of the equalizer filter. A method according to the present invention may furthermore comprise generating a comparison signal and using this comparison signal in adjusting the higher frequency gain of the at least one amplifying compensation stages. A method according to the present invention may furthermore comprise generating a comparison signal and using this comparison signal in adjusting the mid-frequency gain of the at least one amplifying compensation stages.

It is an advantage of the present invention that the devices and methods for equalizing provide a margin for the compensation in two directions around a target compensation level, the target compensation level being about halfway between matched compensation and overcompensation by at least several dB.

It is an advantage of the present invention that the relaxation of the required tolerance on the compensation level considerably improves the robustness and data-restoration capability of equalizer filters including that of fixed, programmable, and self-adaptive equalizer filters.

It is an advantage of the present invention that the amount of compensation required for reliable data restoration extends from exact compensation to overcompensation by at least several decibels.

It is an advantage of the present invention that both matched compensation and overcompensation can be performed in each stage of the equalizer filter.

Although there has been constant improvement, change and evolution of devices in this field, the present concepts are believed to represent substantial novel improvements, including departures from prior practices, resulting in the provision of more efficient devices of this nature.

The teachings of the present invention permit the design of improved equalizer filters and equalizer filtering methods for use in multistage equalizer systems which provide restoration of data signals transmitted over a communication channel showing high frequency attenuation behaviour. More in particular, structures and methods are provided that deliver enhanced tuning tolerance due to the allowance of overcompensation by several decibels.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIGS. 3a to 3e show simulated eye diagrams for an input signal that has been communicated over 0 m coax (at 1.5 Gbps) at different nodes in an equalizer filter as shown in FIG. 1.

FIG. 5b shows the influence of the signal provided at a gain input terminal on the filtering transfer behaviour of the amplifying compensation stage as shown in FIG. 5a.

FIG. 20 shows several gain curves associated with a cascade of 6 amplifying gain stages as in FIG. 18a.

Figure 1:
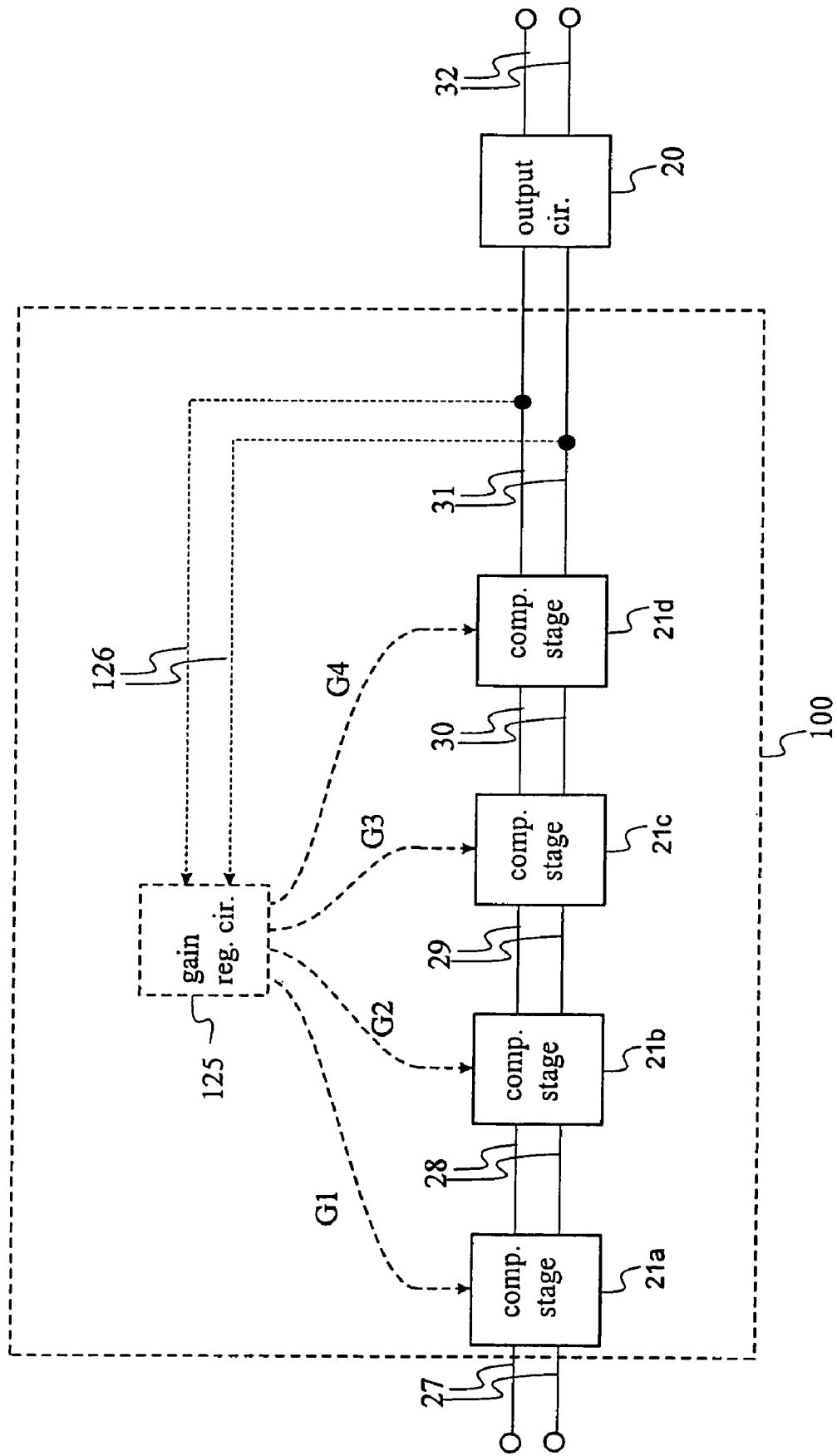
FIG. 1 shows a schematic representation of an equalizer filter with multiple amplifying compensation stages and a gain control loop according to a first embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will be described by a detailed description of several embodiments of the invention. It is obvious that other embodiments of the invention can be configured by a person skilled in the art without departing form the true spirit or technical teaching of the invention, the invention therefore being limited only by the terms of the appended claims. It will be clear for a person skilled in the art that the present invention is also applicable to similar circuits that can be configured in any transistor technology, including for example, but not limited thereto, CMOS, BICMOS and SiGe BICMOS. It will furthermore be clear that similar merits of the invention can be obtained when single-ended signals are implemented as differential signals and vice-versa, without departing from the true spirit of the invention.

In a first embodiment, the invention relates to an equalizer filter 100 as schematically shown in FIG. 1 which achieves an allowable overcompensation with a limited amount of jitter. Jitter is the unwanted variations of a binary signal's leading and trailing edges. It occurs as the signal is processed or transmitted over a transmission channel from one point to another. Jitter also is a time displacement, either periodic or random, of a signal's switching edges. Excessive jitter always increases the bit-error rate (BER) in the transmission system. As a result, most serial data-communications systems have jitter standards that must be met to ensure robust performance and the quality of service (QoS) expected in today's networks. The filter may be used in a suitable electronic device, e.g. in a modem or receiver of a telecommunications device.

The equalizer filter 100 shows a cascade of amplifying compensation stages 21a, 21b, 21c, 21d of a multi-stage equalizer system. The compensation stages 21a, 21b, 21c, 21d are coupled in series in cascade. The number of amplifying compensation stages 21a, 21b, 21c, 21d depends on the wanted or required total compensation to be reached, and can differ from application to application. This number also depends on the used circuit integration technology. Therefore, although—by way of example—an equalizer filter 100 is shown having four amplifying compensation stages 21a, 21b, 21c, 21d, the invention is not limited thereto. The amplifying compensation stages 21a, 21b, 21c, 21d can be any type of suitable compensation stages, i.e. compensation stages with a fixed higher frequency gain compensation, programmable compensation stages, tunable compensation stages, . . . Some explicit—non-limiting—examples will be given in more detail further in the description. Amplifying compensation stages 21a, 21b, 21c, 21d typically show a frequency gain which increases with increasing frequency, further called higher frequency gain, at least to an upper data frequency. The upper data frequency is at least half the data bandwidth or communication bit rate. For example, a 1.5 Gbps data bandwidth has an upper data frequency $F_u$ of 750 MHz or higher. The frequency gain can e.g. be between 1 dB and 30 dB per stage, preferably between 3 dB and 15 dB per stage, for a data rate of 1.5 Gbps. For Low-voltage equalizer filters, it is recommended in PCT/EP04/001414 to limit the frequency gain or compensation level per stage to a lower value, e.g. to 5 dB. The data rate of the input signal that can be received by an equalizer filter 100 may typically be within the range 1 Mbps and 100 Gbps. Typically, a signal is supplied to the input node 27 of equalizer filter 100 that has more or less suffered from frequency attenuation from a transmission channel with limited bandwidth characteristics, whereby higher frequencies are more attenuated than lower frequencies. The input signal is inputted in the equalizer filter 100 at input node 27, which serves as the differential input node of the amplifying compensation stage 21a.

In order to be able to illustrate the compensation behaviour of the equalizer filter 100 and the effect of the different compensation stages 21a, 21b, 21c, 21d, intermediate nodes 28, 29, 30 and 31 are defined between compensation stages 21a and 21b, compensation stages 21b and 21c, compensation stages 21c and 21d and compensation stage 21d and output circuit 20 respectively. Output circuit 20 has an output node 32 and can include any useful stage following an equalizing filter in an equalizer system, including but not limited to a bit-slicer, a limiting amplifier, a DC-restoring system or a Schmitt-trigger, and possibly an output driver stage, all known by a person skilled in the art. The output circuit 20 together with the equalizer filter 100 are part of an equalizer system. This output circuit 20 may be provided to compensate amplitude variations obtained by equalizing, at the expense of very little or no additional jitter. It is a specific feature of the present invention that the equalizer filter 100 furthermore is adjusted to achieve allowed overcompensation with a limited amount of jitter. The amount of allowed overcompensation reaches up to 5 dB, preferably up to 10 dB, more preferably up to 15 dB, keeping jitter below 0.3 UI. The units of jitter measurement are picoseconds peak-to-peak (ps p-p), rms, and percent of the unit interval (UI). The p-p measurement states the maximum to minimum amount of time deviation, usually in picoseconds. A jitter measurement can also be the p-p average over a 30 or 60 s duration, or over, say, 10,000 cycles. Rms jitter is one standard deviation ($\sigma$) of the p-p jitter value where the distribution is Gaussian in nature. Jitter also is expressed as a percentage of time compared to the UI or one bit time. For example, one UI at 10 Gbits/s is 100 ps. A jitter specification might be 40 mUI, meaning 4 ps. For equalizer circuits a total jitter level of 0.3 UI is generally accepted, however this can be somewhat more or less, depending on the quality of the attached resampling system and on the expected jitter level due to other sources of jitter, like cross-talk or ground bounce effects. Conditions to be fulfilled to achieve allowed overcompensation with a limited amount of jitter, and thus fulfilled by the equalizer filter of the present invention, are twofold. A first condition is that the amplitude of the analog signals that carry data, including their signal peaks, in all stages will not pass beyond the saturation level of the amplifiers, neither in the internal data-nodes, nor at the output nodes of each stage. This condition has to be met in as well the matched compensation situation as in the envisaged range of overcompensation where acceptable low additional jitter has to be reached. A second condition is that the higher frequency gain in each of the amplifying compensation stages must always be increasing for at least the last decade in frequency below the upper data frequency of the signal. If these conditions are fulfilled, overcompensation with only limited amount of jitter can be obtained. If the latter condition is difficult to reach because of bandwidth limitations, the number of stages in the equalizer filter is increased, and the maximum amount of compensation per stage is lowered, making it easier to achieve the higher frequency gain condition. The first condition should be met for all process and temperature variations that an integrated circuit technology can reach, and the impact of these variations on the devices' parameters should be taken into account. Further, the targeted range of transmit amplitudes at the transmitter side of the channel has to be taken into account as well. For example, a range of 250 mV to 1.5 V can be specified for the differential peak-to-peak transmit amplitude. Higher transmit amplitudes than 1.5 V can be covered as well, however, one would generally not transmit too high amplitudes for EMI reasons. Lower transmit voltages than 250 mV can be covered as well, however only as far as signal to noise ratio permits.

It is a specific feature of the present invention that the two conditions, through which equalizing including overcompensation with a limited amount of jitter is obtained, are met in a relatively easy way due to the presence of gain control means. The gain control means may be any suitable means for controlling the gain that allows to considerably relax the non-saturation condition. The gain control means may e.g. be at least one gain regulating circuit 125. This at least one gain-regulating circuit 125 generates a gain control signal G1 . . . G4 for at least one of the amplifying compensation stages 21*a*, 21*b*, 21*c* and 21*d* and provides it to a gain input terminals (not shown in FIG. 1) of the at least one amplifying compensation stage 21*a*, 21*b*, 21*c* and 21*d*. The gain regulation may be dependent on the output signal of the equalizer filter 100, e.g. by providing feed-back of the output signal at node 31 to the gain-regulating circuit 125 through feed-back connection 126. The applied gain control signal $G_1$, $G_2$, $G_3$, $G_4$ applied to the gain input terminal (not explicitly shown in FIG. 1) of an amplifying compensation stage 21*a*, 21*b*, 21*c*, 21*d* influences the gain of that amplifying compensation stage 21*a*, 21*b*, 21*c*, 21*d* substantially equal over the used frequency range. To further facilitate design and considerably enhance robustness, it is a preferred choice to have a gain input terminal (not shown in FIG. 1) at each amplifying compensation stage 21*a*, 21*b*, 21*c*, 21*d*, so that a gain control signal $G_1$, $G_2$, $G_3$, $G_4$ can be provided in parallel to each of the amplifying compensation stages 21*a*, 21*b*, 21*c*, 21*d*. Most easily the amplifying compensation stages 21*a*, 21*b*, 21*c*, 21*d* are driven with the same signal for the cascaded set of stages. In other words, gain control signals G1 . . . G4 can be the same. On the other hand, the gain control signals G1 . . . G4 also can be different for each amplifying compensation stage 21*a*, 21*b*, 21*c*, 21*d*. Gain regulating circuit 125 can be designed by a person skilled in the art, envisaging the auto-gain option. In this way the gain will be continuously adapted based on the signal amplitude of one of the outputs of the amplifying compensation stages 21*a*, 21*b*, 21*c*, 21*d*.

Figure 2A:
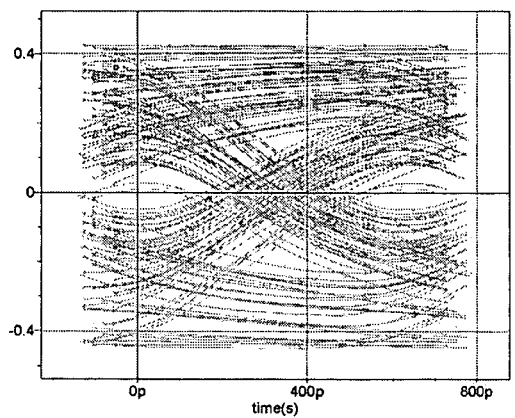
FIGS. 2a to 2e show simulated eye diagrams for an input signal that has been communicated over 50 m coax (at 1.5 Gbps) at different nodes in an equalizer filter as shown in FIG. 1.
Figure 2B:
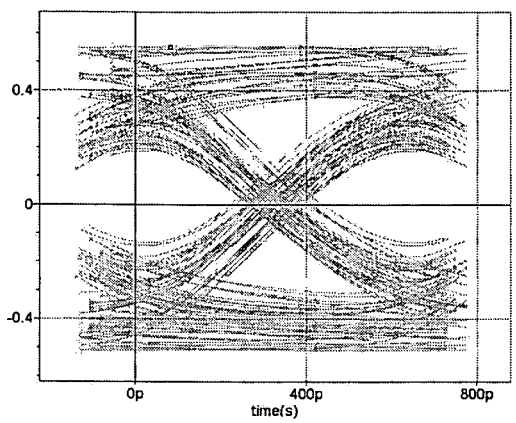
Figure 2C:
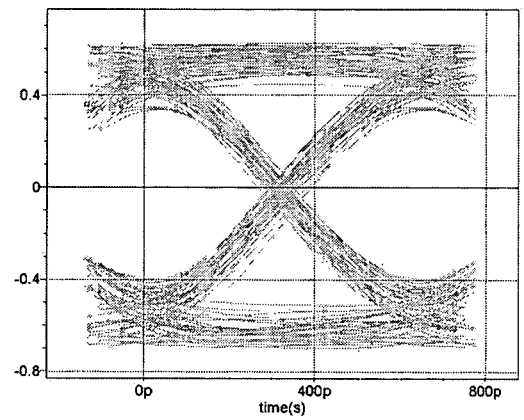
Figure 2D:
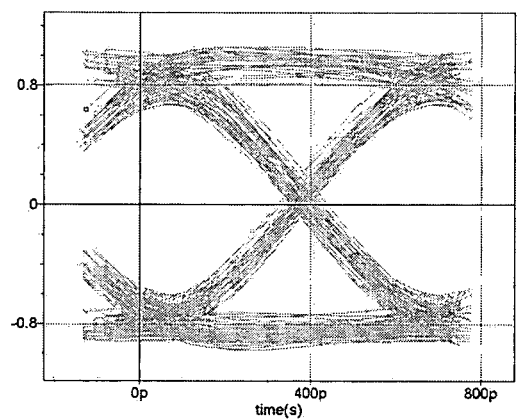
Figure 2E:
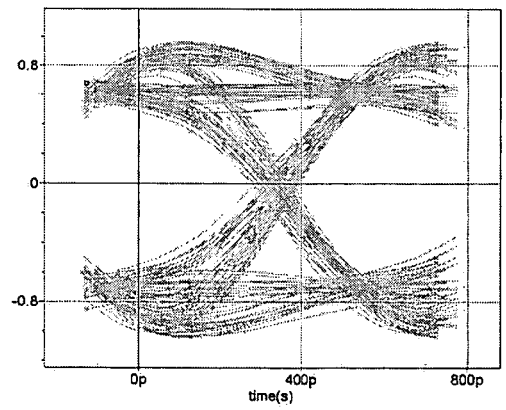
Figure 3E:
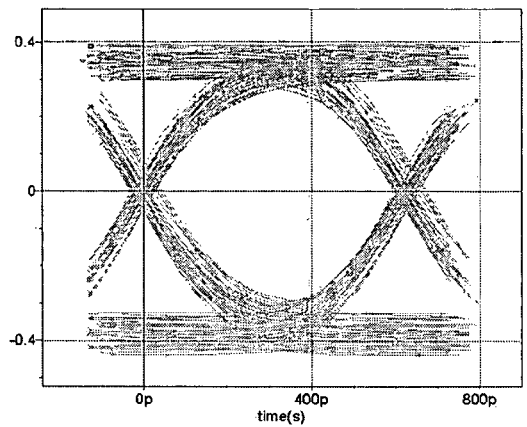
Figure 3E:
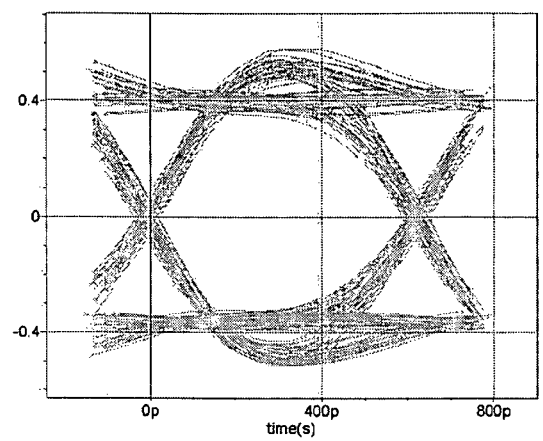
Figure 3E:
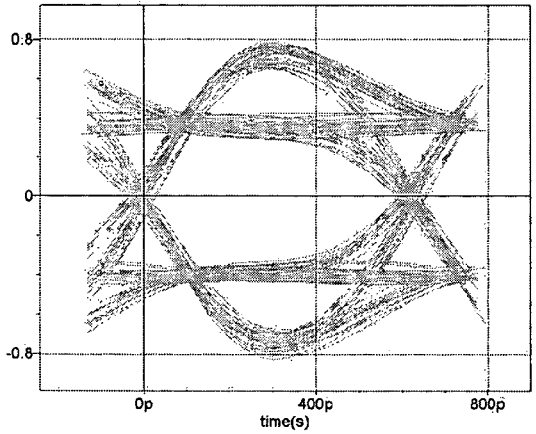
Figure 3E:
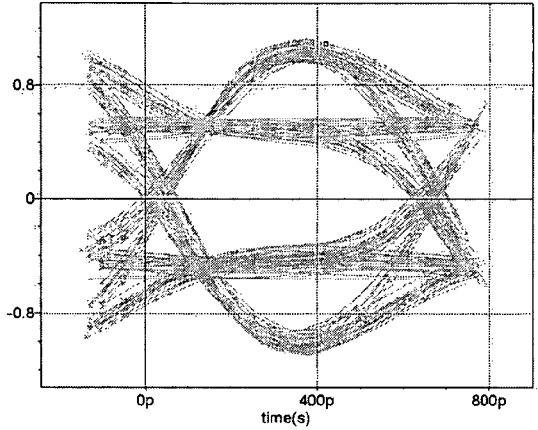
Figure 3E:
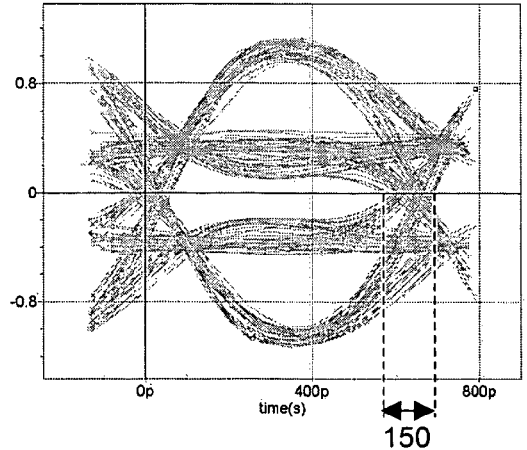

In order to illustrate the effect of the presence of the at least one gain regulating circuit 125 and the feed-back connection 126 on the jitter if overcompensation is achieved, two examples are shown for a given set of operating conditions, i.e. in identical operating conditions but for a specific signal sent through a coax cable having different cable lengths. FIG. 2*a* to FIG. 2*e* show the eye diagrams of a simulation whereby as an input signal on node 27, the measured output of a 50 m coax cable has been taken having at its input a non-return to zero (NRZ), pseudo random signal at 1.5 Gbps. FIG. 2*a* shows this signal in eye-diagram form. The resultant eye-diagrams at the output of stages 21*a*, 21*b*, 21*c* and 21*d*, being nodes 28 . . . 31 are given by FIGS. 2*b* . . . 2*e*, for a given set of conditions for the equalizer filter 100, as set out below. FIG. 3*a* to FIG. 3*e* show the eye diagrams of a simulation whereby as an input signal on node 27, the measured output of a 0 m coax cable has been taken having at its input a non-return to zero signal (NRZ) at 1.5 Gbps. The 0 m length actually is a coax of the order of centimeter length; however, for the purpose of clarity it is called 0 m length coax. FIG. 3*a* shows this signal in eye-diagram form. The resultant eye-diagrams at the output of stages 21*a*, 21*b*, 21*c* and 21*d*, being nodes 28 . . . 31 are given by FIGS. 3*b* . . . 3*e*, for the same set of conditions for the equalizer filter 100, as set out below, also having a rate of 1.5 Gbps. It will be obvious for a person skilled in the art that, although the simulations have been performed for an exemplary set of conditions for the equalizer filter 100 and for specific input signals, these operation conditions for the equalizer filter 100 are only used by way of illustration and that the invention is not limited thereby. The simulations are obtained with the following set of conditions for equalizer filter 100: the amplifying compensation stages 21*a*, 21*b*, 21*c*, 21*d* have a fixed higher frequency gain compensation of about 3.5 dB per stage at 750 MHz compared to 0 MHz for the data-rate of 1.5 Gbps. This fixed frequency gain 320, 322, 324, 326 is e.g. shown in FIG. 5B. Each amplifying compensation stage 21*a*, 21*b*, 21*c* and 21*d* receives at its gain input terminal a gain control signal G1 . . . G4, respectively, generated by the gain-regulating circuit 125. In the example leading to the simulations of FIGS. 2*a*-2*e* and FIGS. 3*a*-3*e*, this gain regulation is made dependent on the output signal at the intermediate node 31 between the last amplifying compensation stage 21*d* and output circuit 20, via feed-back connection 126, as represented in FIG. 1. For these simulations the gain control signals G1 . . . G4 are tied together, operating the gain control for the different amplifying compensation stages 21a, 21b, 21c, 21d in a parallel way. The gain regulating circuit 125 detects, in the present embodiment, the peak amplitude of the signal at the output node of the last amplifying compensation stage 21d by means of feed-back connection 126, and regulates the gain control signals G1 . . . G4 following automatic gain principles as known by a person skilled in the art. When the detected peak amplitude is too low, the gain control signals G1 . . . G4 are increased, thereby eventually increasing the amplitude of the signal at the output node of the last amplifying compensation stage 21d. Vice versa, when the peak amplitude at the output node of the last amplifying compensation stage 21d becomes too high, the gain control signals G1 . . . G4 are decreased, lowering the amplitude at the output node of the last amplifying compensation stage 21d. The eye diagrams shown in FIG. 2a to FIG. 2e and FIG. 3a to FIG. 3e allow to analyse the transition time deviations of a digital communication signal. The deviations, also known as jitter, are a measure of the signal quality obtained and they represent the variance in the actual transition time from the ideal transition time. In addition to jitter, an eye diagram can also produce information on the voltage swing, the rise time, and the fall time of the signal. Jitter is apparent when a repetitive waveform is displayed versus a reference waveform. In both FIGS. 2a-2e and FIGS. 3a-3e, the differential starting amplitude is about 800 mV peak-to-peak, as can be seen at the eye diagrams of the signals at input node 27 in FIG. 2a and FIG. 3a respectively. By going through the eye diagrams of the signal at intermediate nodes 28, 29, 30, and 31, one can see that the differential peak amplitude gradually increases up to about 1750 mV. In this case a 1750 mV is preferred, since it is a little smaller than the maximum differential output of 2000 mV that can be supported in each of the amplifying compensation stages without going into saturation at one of the nodes' data-signals and without running into clipping of signals on these nodes. Clipping of data-signals is detrimental for the capability to overcompensate without generating an excessive amount of deterministic jitter. Data-signals are signals on nodes in the high-speed data path leading to the high-speed data recovery of the equalizer filter 100. The given coax has −10 dB of loss at 750 MHz. This means that HIGH-LOW-HIGH-LOW transitions in a 1.5 Gbps data-stream will be attenuated by a factor of 3.16 (equalling −10 dB). The eye diagram after compensation with three amplifying compensation stages 21a, 21b, 21c, whereby each stage is compensating 3.5 dB totalling 10.5 dB of compensation up to intermediate node 30, shows that a wide open eye diagram is obtained at this intermediate node 30 (see FIG. 2d). After the last stage 21d, at intermediate node 31, an overcompensation of 4 dB is present without too much increase in jitter, as can be seen in FIG. 2e. The 0 m coax, i.e. the zero length case shows an initial attenuation of −3 dB at 1.5 Gbps, as can be seen from the High-Low-High-Low transitions attenuated by a factor of about 0.7 of total amplitude. This attenuation can be e.g. caused by some connector and/or bondwire attenuation. The subsequent eye diagrams as shown in FIG. 3a to FIG. 3e show four times an amplitude-increase of 3.5 dB at the upper data frequency $F_u$, a frequency corresponding to the highest HIGH-LOW-HIGH-LOW transitions, starting from the open eye at the input node 27 (FIG. 3a) up to the output of the last amplifying compensation stage 21d at intermediate node 31. In total, the amplitude increase thus is +14 dB. This is leading to an effective overcompensation of 11 dB, when starting at −3 dB. However, even though having this strong overcompensation, only limited deterministic jitter 150 is present at the output of the last stage 21d (indicated in FIG. 3e). This is made possible in this case by the auto-gaining mechanism together with the given design construction. Both together cause the output signal of the amplifying compensation stages 21a, 21b, 21c, 21d to be increased gradually from stage to stage, up to the last amplifying compensation stage 21d, whereby at the output of the last stage, the differential peak-to-peak level is reached of about 1750 mV, a level that is below saturation level. By having similar stages, and knowing that the stages are all equal, a gradual increase of peak-to-peak output amplitude is in this example obtained whereby it is ensured that with high certainty no data-signal node in any stage can get into saturation. All coax lengths in-between 0 m and 50 m can be connected as well and their output signal can get restored successfully, resulting in intermediate situations, i.e. generating eye diagrams in between those from FIGS. 2a-2e and FIGS. 3a-3e. It can be seen that in some cases even an overcompensation tolerance of more than 10 dB can be achieved when implementing the details of the present invention thoughtfully. From these simulations the advantage of the invention becomes apparent. A large set of cable lengths can be connected without having to estimate the amount of required compensation. More in general, the examples illustrate that the equalizer filters and the corresponding equalizer systems and methods of equalizing, allow to provide equalizing for a wide variety of cables and cable lengths, without the need for estimating the amount of compensation required. No higher frequency gain tuning system is required. It can be sufficient to generate only gain control signals. These gain control signals can be fixed or variable in time. It is important to mention that variations on such gain control signals G1 . . . G4 generate very little additive jitter. A change in gain, independent of the frequency in the considered frequency range, generally merely influences the overall amplitude of the eye-diagram, and has very little influence on the position of the zero-crossings of the regenerated output pattern at intermediate node 31. This is true as long as there are no data-signal nodes that go into saturation. In case of such amplitude fluctuations, subsequent output circuit 20 can compensate this type of eye diagram variation by implementing e.g. a limiting amplifier or Schmitt-trigger, at the expense of very little or no additional jitter. This insensitivity of gain control signals to jitter is important, since jitter addition lowers the subsequent signal recovery quality in terms of bit-error-rate. In other words, in the present embodiment a gain regulating circuit 125 may be provided that by an auto-gain principle ensures a fixed amplitude at the output of one of the amplifying compensation stages 21a, 21b, 21c, 21d, preferably at the last stage, so that wide operating conditions are allowed, including for example also a large amplitude signal transmit range. By checking and controlling during careful construction it can be ensured that the non-saturation requirement gets fulfilled for all data-nodes in all amplifying gain stages 21a, 21b, 21c, 21d.

Figure 4:
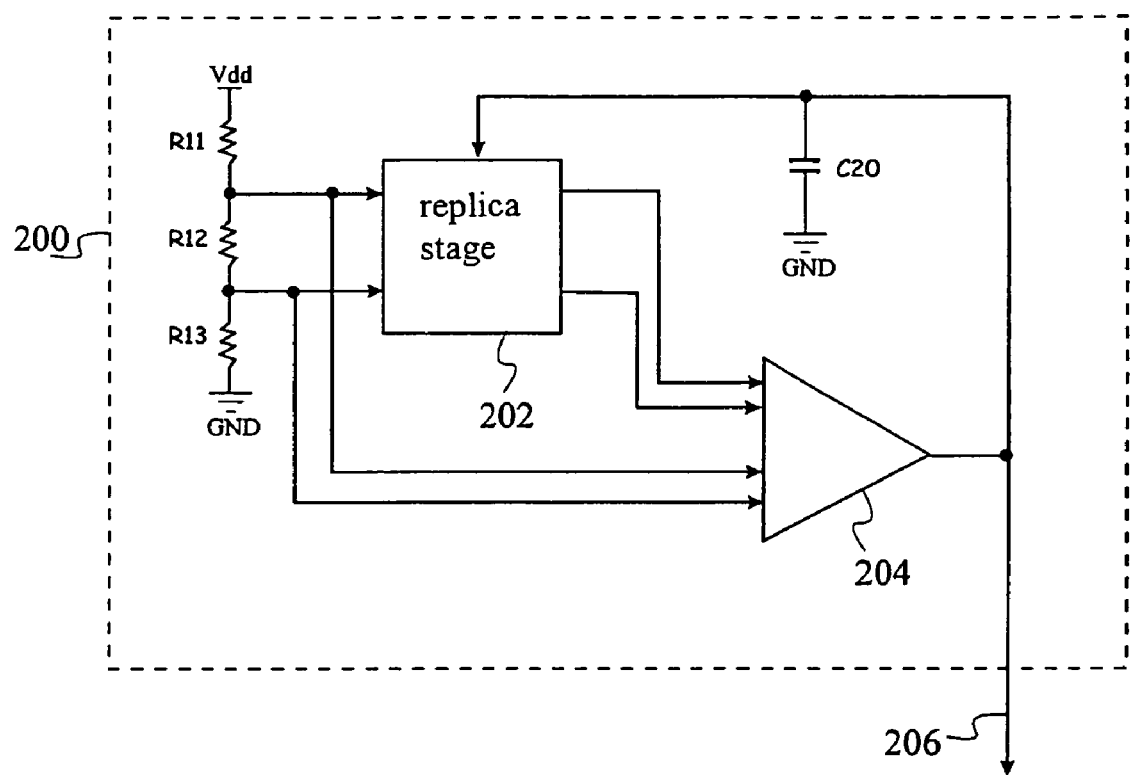
FIG. 4 shows a gain regulating circuit using a replica biasing principle as can be used in equalizer filters according to the present invention.

In a second embodiment, an equalizer filter is described which preferably is used in cases where mainly process and temperature variation have to be considered, whereby, for example, the transmit amplitude is known beforehand. The equalizer filter comprises the same components and features as described in the first embodiment, but the gain regulating circuit 125 for generating gain control signals G1 . . . G4 is chosen to be a replica biasing technique based gain regulating circuit 200, such that the feed-back connection 126 from the intermediate node 31 between the last amplifying compensation stage 21d and the output circuit 20 does not need to be present. An example of a replica biasing technique based gain regulating circuit 200 is shown in FIG. 4. Inside this circuit 200, a replica stage 202, being a replica of one of the amplifying compensation stages 21a, 21b, 21c, 21d is biased under similar conditions, with a known DC input voltage determined by resistor R11, resistor R12 and resistor R13, whereby the DC output of replica stage 202 is compared with its DC input by means of comparator 204. In this way, a unity gain can be obtained, independent of process parameters or chip temperature. The capacitor C20 is provided to make the node to which it is attached the dominant-pole-node in the regulating feedback loop. A designer skilled in the art can as well easily obtain another fixed gain value just by having an additional voltage divider at one of the differential inputs of the comparator 204. A fixed DC amplification by e.g. a factor of 1.3 per stage can hence be achieved. By outputting a gain-determining signal 206 from the comparator 204, and applying it to the gain input terminal (not shown explicitly) of the corresponding amplifying compensation stage 21a, 21b, 21c, 21d, a signal is present for replacing the gain control signals G1 ... G4 of the cascade of amplifying compensation stages 21a, 21b, 21c, 21d. The same gain-determining signal 206 is also applied to the replica stage 202, so as to make the replica stage 202 change the same way as the replicated amplifying compensation stage 21a, 21b, 21c, 21d. This replica-biasing solution is only the preferred choice of implementation of the present invention, when for one reason or another, the continuously updating auto-gain function is hindering specified operating conditions. This can be the case, for example, when the incoming data has to be recovered from the first bit on, and whereby there would be no time for an auto-gain loop to converge to its end-value. In other words, the use of a gain regulating circuit based on replica biasing techniques allows to drive gain input terminals of each amplifying compensation stage 21a, 21b, 21c, 21d and thus to achieve for all data-nodes including the output nodes in all stages, an operation in non-saturation mode, for all process and all temperature ranges.

In the following description more explicit examples of amplifying compensation stages 21a, 21b, 21c, 21d that can be used in the different embodiments of the present invention are given. It will be obvious for the person skilled in the art that other amplifying compensation stages 21a, 21b, 21c, 21d, having a different electronic circuit, can be used or that, for a given circuit, the values of the different components used can differ.

Figure 5A:
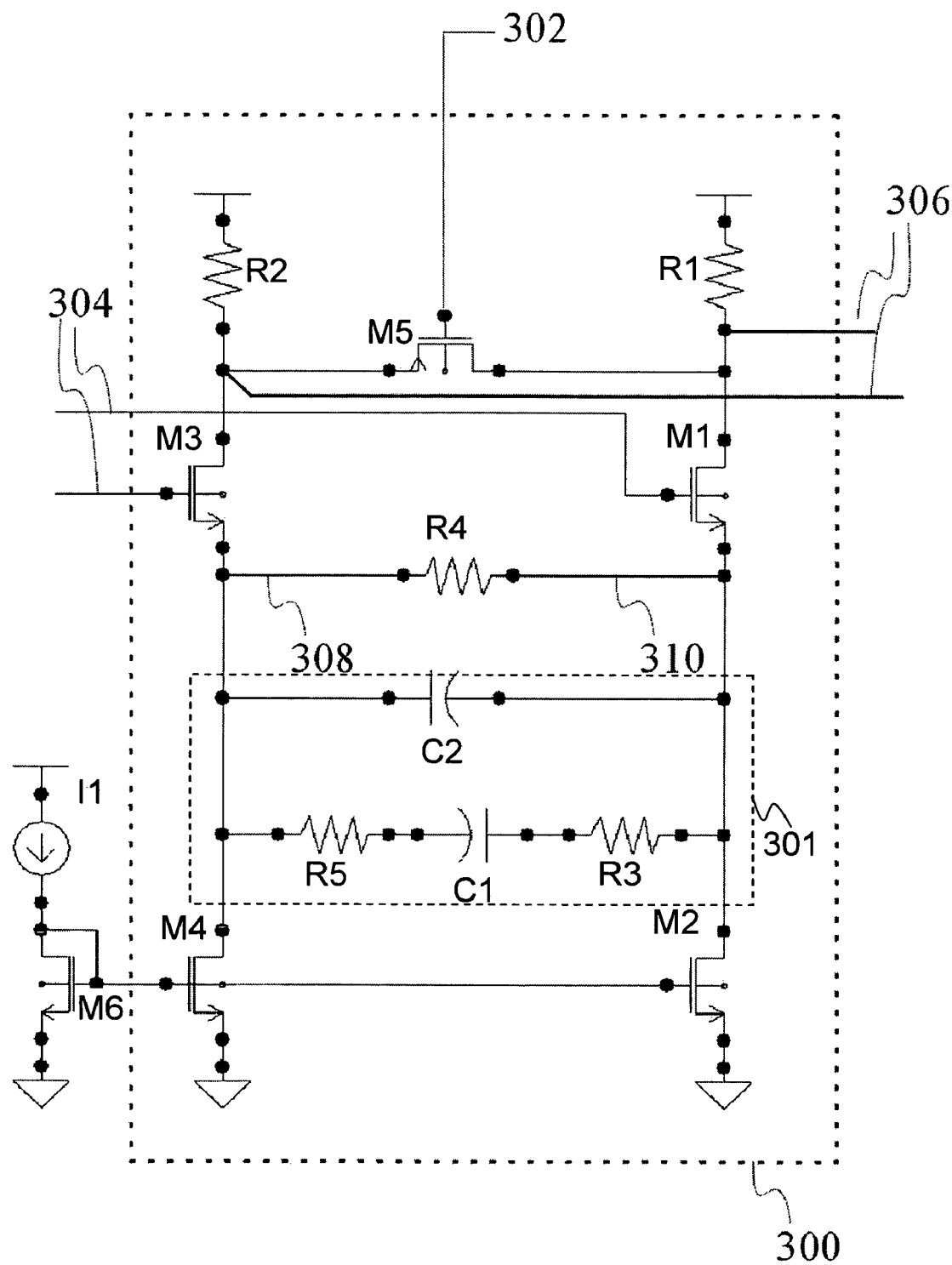
FIG. 5a shows an equivalent electrical circuit of an amplifying compensation stage for use in an equalizer filter according to an embodiment of the present invention.
Figure 5B:
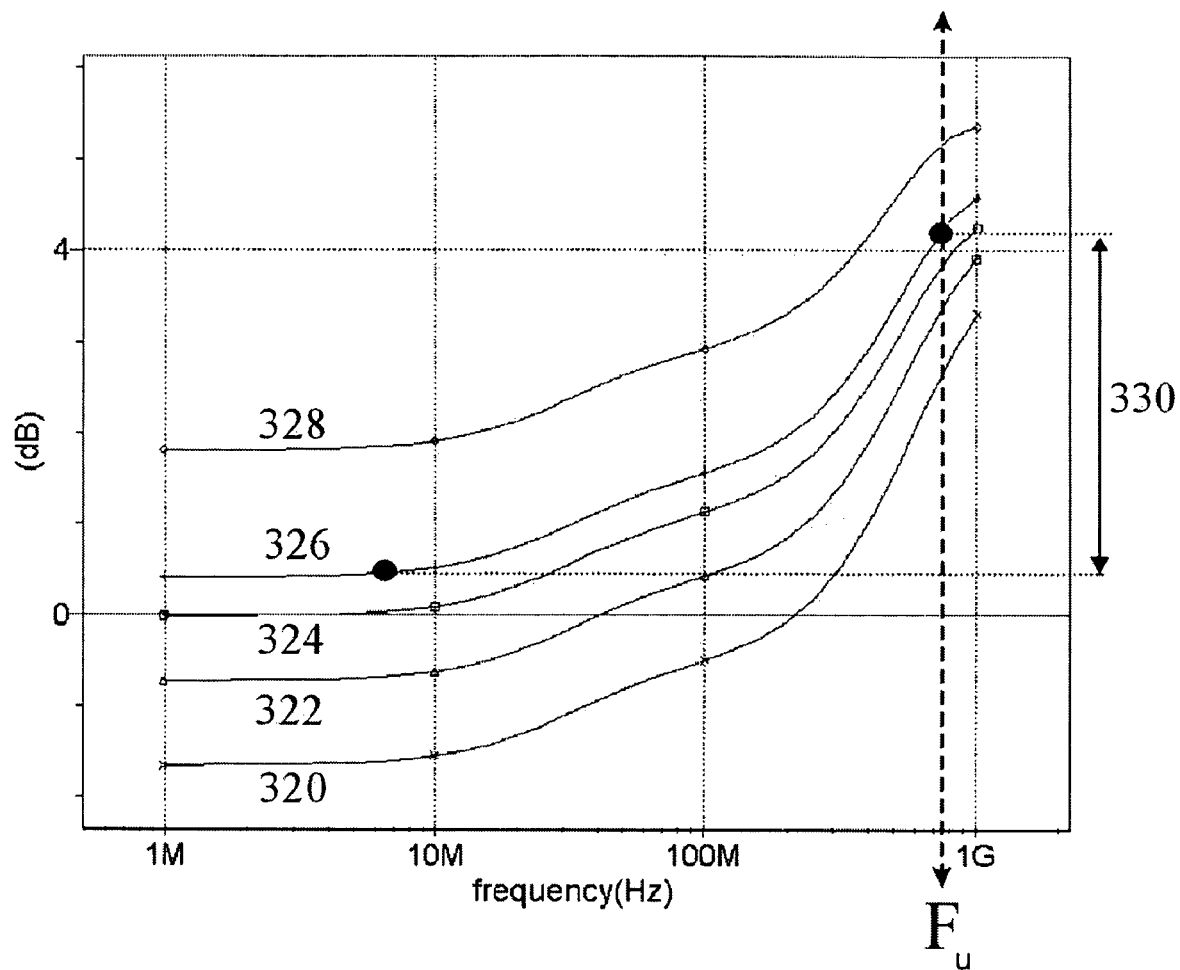

FIG. 5a shows an amplifying compensation stage 300 with a higher frequency gain which is fixed in time for each frequency but increasing for higher frequencies. The amplifying compensation stage 300 receives an input signal between differential input data nodes 304, and generates an output signal between differential output data nodes 306. The transistors M3 and M1 function as source followers that are biased by the transistors M4 and M2, which e.g. can be transistors, mirroring the current I1. The voltage difference at the input node 304, is substantially taken over between the nodes 308 and 310, thereby determining the current through resistive element R4 at low frequency. The latter current infers a voltage difference over the output node 306, after having been conducted through transistors M3 and M1 with opposite sign. The compensation stage 300 comprises a gain setting circuit 301 for delivering the increasing gain at higher frequencies. The gain setting circuit 301 may for example comprise a parallel connection of, on the one hand, a first capacitive element (capacitor C1) in series with a first resistive element (series connection of resistor R3 and resistor R5) and, on the other hand a second capacitive element (capacitor C2). By way of example, two resistive elements R3 and R5 are shown in FIG. 5a for symmetry reasons, but the invention also operates if only a single resistive element is used. The group of circuit elements 301 form a decreasing impedance for higher frequency, increasing the gain of the stage at higher frequency. The elements R3, R5 and C1 form a zero-pole pair in the filtering behaviour and the capacitor C2 forms a zero in the transfer characteristics. The amplifying compensation stage 300 with fixed higher frequency gain comprises a gain input terminal 302 to which a gain control signal may be applied. In the example illustrated in FIG. 5a, the gate of a transistor M5 forms the gain input terminal 302 of the amplifying compensation stage 300. Transistor M5 will determine the differential output resistance, as it is coupled between the differential output data nodes 306, and influences as such the overall gain of the compensation stage 300. Higher frequency gain at the upper-data frequency $F_u$ typically ranges between 2 dB and 15 dB per stage. This upper data frequency is indicated by $F_u$ in FIG. 5b. The amplification of the stage is proportional to R2/R4. FIG. 5b shows a graph of the filtering transfer characteristic of the amplifying compensation stage 300, given in decibel (dB). Curves 320, 322, 324, 326, 328 each show higher frequency gain that is ever increasing as from a first value at least 1 decade in frequency below the upper data frequency $F_u$ upto the upper data frequency $F_u$ of 750 MHz. The higher frequency gain at the upper-data frequency $F_u$ for the exemplary stage shown is about 3.5 dB for each of the curves 320 to 328 and is specifically indicated in the graph for curve 326 by the value 330, i.e. the difference between the gain value at the upper data frequency $F_u$ and the gain value at lower frequencies. Curves 320, 322, 324, 326, 328 are the curves for different gain control signals to be inputted in the gain input terminal 302, the gain control signals having an amplitude of 0.6, 0.8, 0.95, 1 and 1.25 V respectively. A higher voltage gives more gain in general. It is to be noted that the gain control signal applied at gain input terminal 302 determines substantially an overall gain on top of the higher frequency gain. This is however not perfect, since the decibel distance between e.g. curve 326 and 328 is not fully constant. At least input node 304, output node 306, internal nodes 308 and 310 are considered to carry data-signals. By way of example, a set of explicit values for the electronic components is given in Table 1.

TABLE 1

| Component | Value | Component | Value |
|---|---|---|---|
| Resistor R1 | 3 k·Ω | Transistor M1 | 16 um/0.35 um |
| Resistor R2 | 3 k·Ω | Transistor M2 | 40 um/0.35 um |
| Resistor R3 | 8 k·Ω | Transistor M3 | 16 um/0.35 um |
| Resistor R4 | 3 k·Ω | Transistor M4 | 40 um/0.35 um |
| Resistor R5 | 8 k·Ω | Transistor M5 | 2 um/0.5 um |
| Capacitor C1 | 280F | Transistor M6 | 40 um/0.35 um |
| Capacitor C2 | 100F | | |

Figure 6:
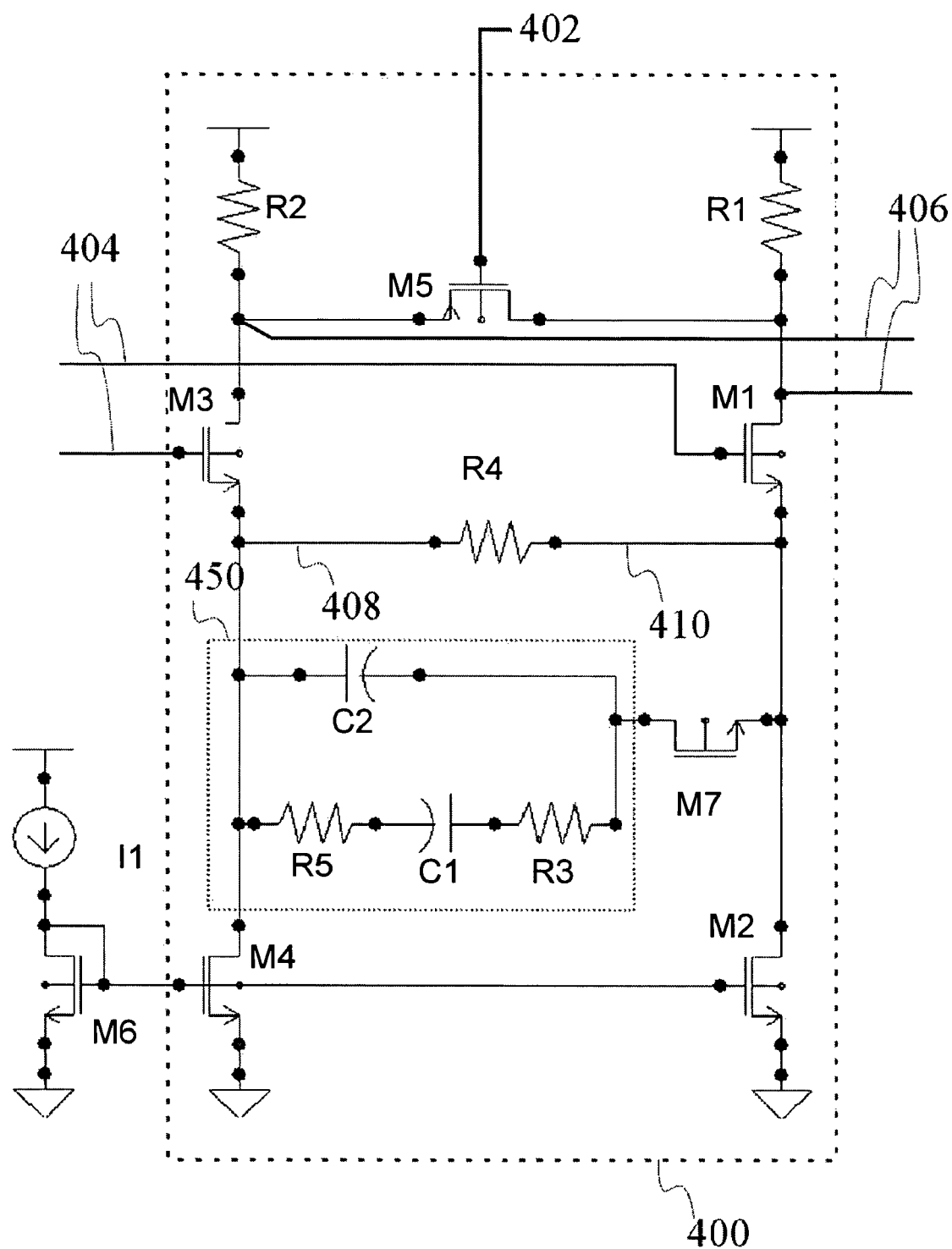
FIG. 6 shows an equivalent electrical circuit of an amplifying compensation stage having a gain input terminal and a higher frequency gain tuning input according to an embodiment of the present invention.

An alternative amplifying compensation stage 400 is shown in FIG. 6. The amplifying compensation stage 400 has a programmable and/or tuneable higher frequency gain function circuit 450 comprising two resistors, i.e. resistor R3 and resistor R5, and a capacitor C1, which are coupled in parallel to capacitor C2, like the circuit in FIG. 5a. The functioning of the amplifying compensation stage 400 is similar to the functioning of the amplifying compensation stage 300, but an additional switching element is provided. By turning on a switching element in series with the higher frequency gain function circuit 450, e.g. transistor M7, the circuit elements grouped as gain function circuit 450, become connected between the sources of transistor M1 and transistor M3, leading to higher frequency gain at the output node 406. When transistor M7 is not conducting, the higher frequency gain disappears. At least input node 404, output node 406, internal nodes 408 and 410 are considered to carry data-signals. The amplifying compensation stage 400 comprises a gain input terminal 402 to which a gain control signal may be applied. In the example illustrated in FIG. 6, the gate of a transistor M5 forms the gain input terminal 402 of the amplifying compensation stage 400. Transistor M5 will determine the differential output resistance, as it is coupled between the differential output data nodes 406, and influences as such the overall gain of the compensation stage 400. By way of example, a set of explicit values for the electronic components are given in Table 2. Other programmable/tuneable amplifying compensation stages are known by the person skilled in the art and can be considered as well for implementing the present invention.

TABLE 2

| Component | Value | Component | Value |
|---|---|---|---|
| resistor R1 | 3 k·Ω | Transistor M1 | 16 um/0.35 um |
| resistor R2 | 3 k·Ω | Transistor M2 | 40 um/0.35 um |
| resistor R3 | 8 k·Ω | Transistor M3 | 16 um/0.35 um |
| resistor R4 | 3 k·Ω | Transistor M4 | 40 um/0.35 um |
| resistor R5 | 8 k·Ω | Transistor M5 | 2 um/0.5 um |
| Capacitor C1 | 280F | Transistor M6 | 40 um/0.35 um |
| Capacitor C2 | 100F | Transistor M7 | 16 um/0.35 um |

Figure 7:
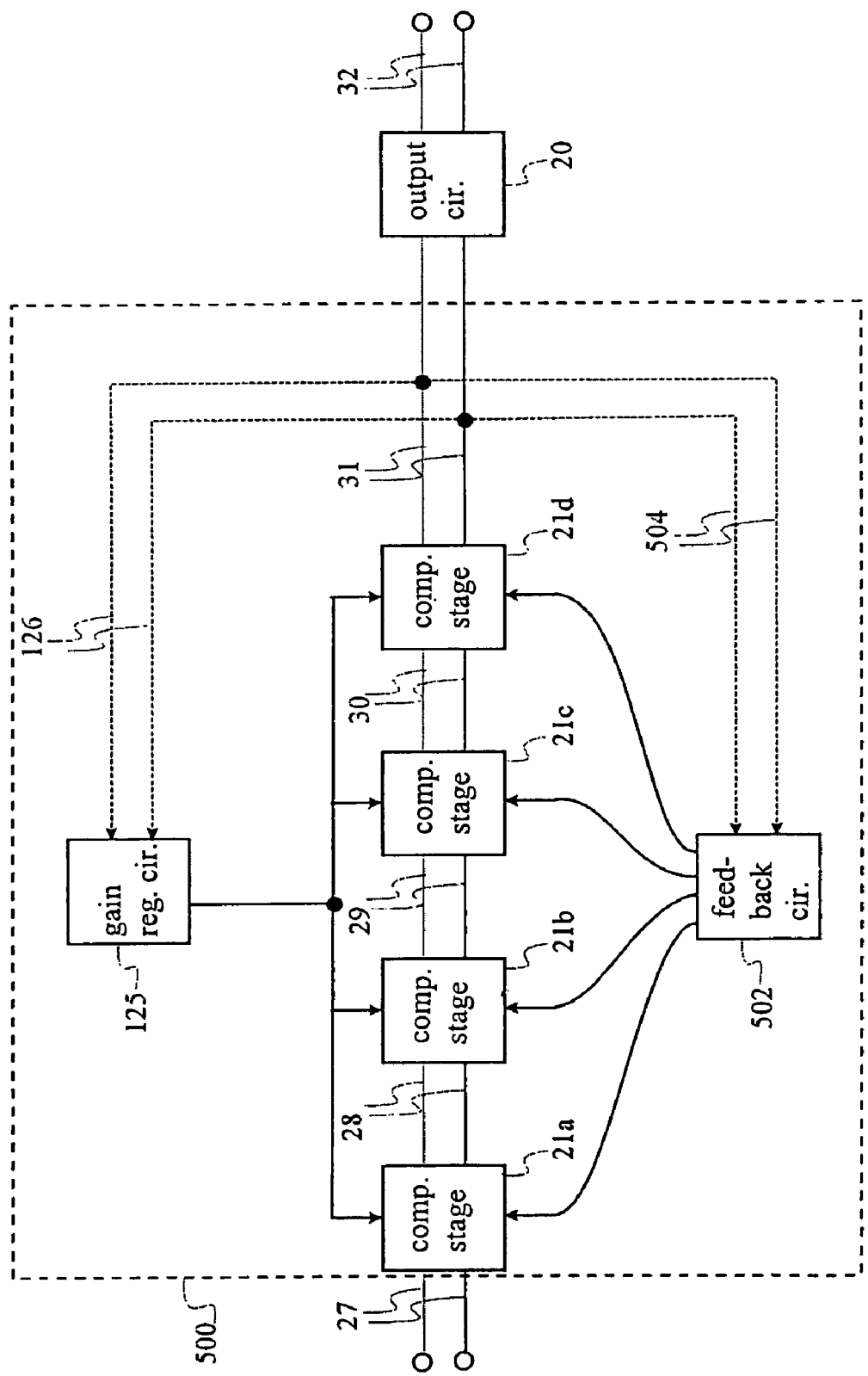
FIG. 7 shows a schematic representation of an equalizer filter having a second self-adapting compensation control loop according to an embodiment of the present invention.

In a third embodiment, the invention relates to a wide range self-adaptive equalizer filter 500. The wide range self-adaptive equalizer filter 500, as shown in FIG. 7 is very robust. The equalizer filter 500 comprises the same components and features of an equalizer filter 100, 300, 400 according to any of the previous embodiments, but the equalizer filter 500 furthermore comprises a second feed-back loop for self adaptation. This second feed-back loop comprises a feed-back circuit 502 and a feed-back connection 504 between an intermediate node 28, 29, 30, 31 positioned after an amplification compensation stage, preferably after the last amplification compensation stage 21d, and the feed-back circuit 502. The feed-back circuit 502 preferably sequentially turns on amplifying compensation stages 21a to 21d until typically matched compensation is reached. For matched compensation typically an error margin of about 1 to 2 dB, depending on the level of compensation and compensation conditions, is allowed. In this embodiment, the precision with which the level of compensation has to be determined can be relaxed considerably in this case of self-adaptation. The amplifying compensation stages 21a, 21b, 21c, 21d that can be used for this embodiment can e.g. be the amplifying compensation stage of FIG. 6 but they are not limited thereto. The amplifying compensation stages need to be always increasing for at least the last decade in frequency below an upper data frequency of the signal. Patent applications EP-02447160 and PCT/EP04/001414, co-pending herewith, describe how to organise the control loop such that matched self-adaptation is achieved possibly with multiple stages, and possibly at lower voltage as well. However, when overcompensation of e.g. 8 dB can be tolerated by the equalizer filter 500, instead of always regulating close to ideal compensation, the self adaptive loop can be designed such that e.g. 4 dB of overcompensation is envisaged as the regulating target. The realized compensation then has a tolerance of reaching its target compensation value by −4 dB to +4 dB. This considerably enhances reliability of adaptive equalizer filters, and also improves the yield with which such circuits can be made. Depending on the used technology, data rate and acceptable jitter level for the given application, using the findings of the present invention will allow an overcompensation between at least 3 dB and maximum 20 dB. A 10 dB allowable overcompensation should be within reach for most given realistic situations.

Figure 8:
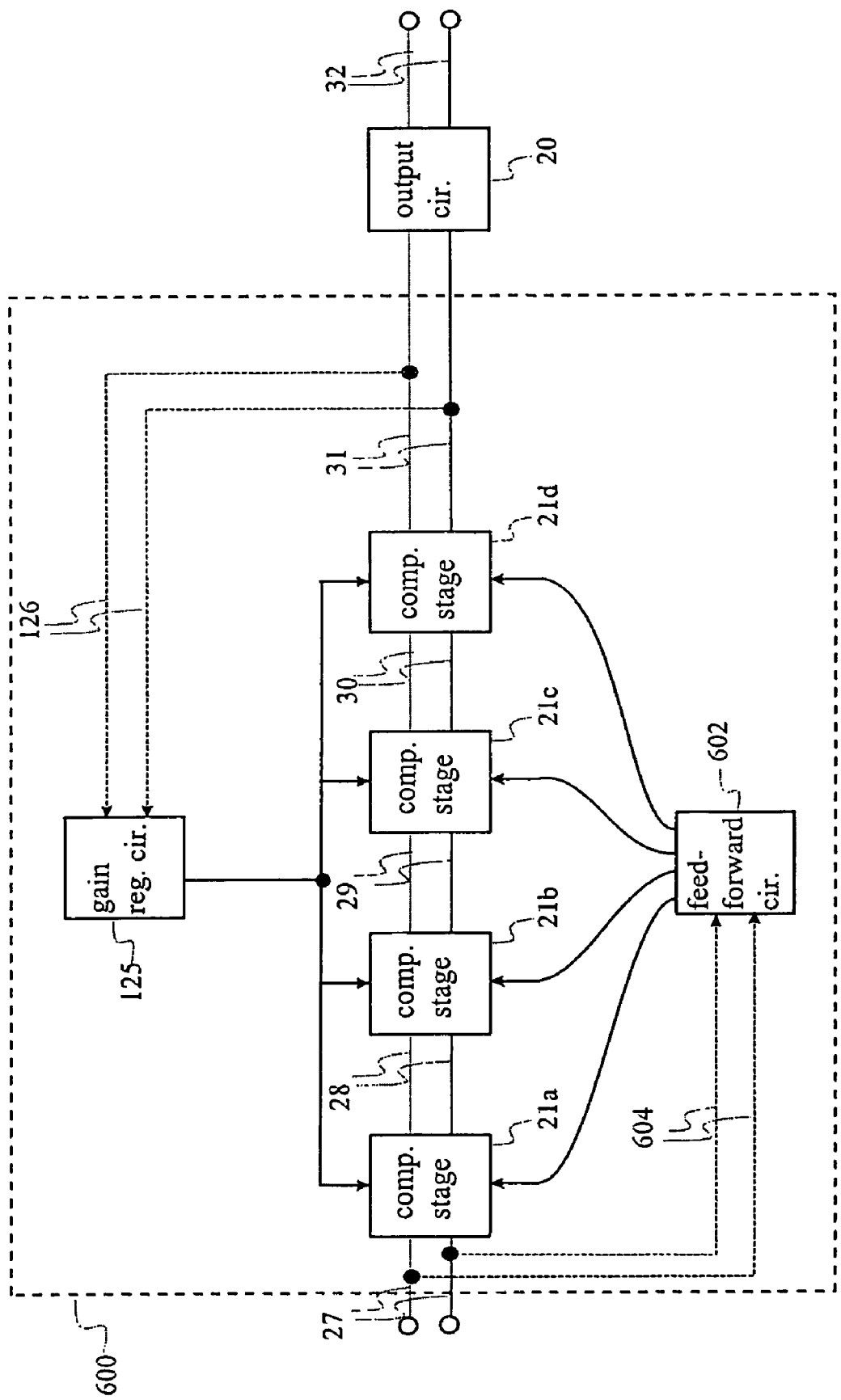
FIG. 8 shows a schematic representation of an equalizer filter based on a self-adapting feed-forward mechanism according to an embodiment of the present invention.

In a fourth embodiment, the invention relates to a self-adaptive equalizer filter 600 as shown in FIG. 8, wherein a large overcompensation is allowed. The equalizer filter 600 comprises the same components and has the same features of the self-adaptive equalizer filters shown in the previous embodiments, but furthermore, the input signal at input node 27 of the equalizer filter 600 is measured and fed to a feed-forward circuit 602 through feed-forward connection 604. Depending on the amplitude or power of this input signal, feed-forward circuit 602 can determine how many of the available amplifying compensation stages 21a, 21b, 21c, 21d will be turned on and will show higher frequency gain. The achievable higher frequency gain with this system is similar as with the previously described system. Due to the presence of hysteresis in the present equalizer filter 600 having a feed-forward circuit 602, the stability of the system will be improved.

Figure 9A:
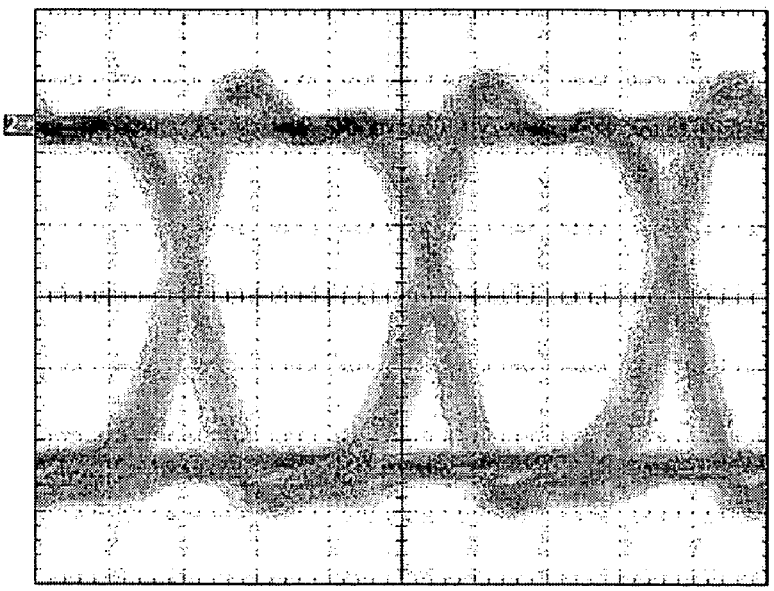
FIG. 9a shows a measured eye diagram at the output of an equalizer filter of the present invention with fixed compensation, restoring the signal after 50 m of coax.
Figure 9B:
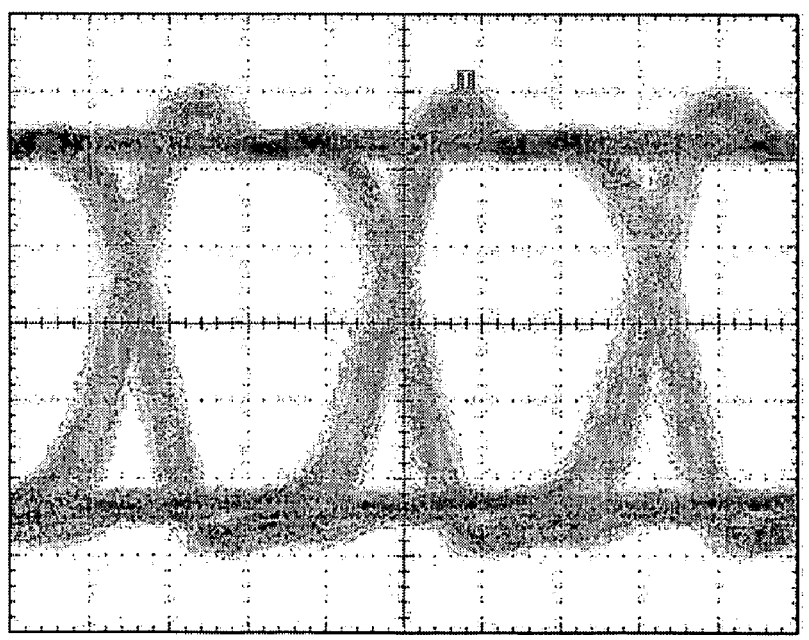
FIG. 9b shows a measured eye diagram at the output of an equalizer filter of the present invention with the same fixed compensation as in FIG. 9a, restoring the signal after 1 m of coax.

A fifth embodiment of the present invention relates to a CMOS circuit comprising an equalizer filter allowing overcompensation with limited jitter, according to the present invention. The equalizer filter comprises components with the same functionalities and the same features as the equalizer filters of any of the previous embodiments, and whereby the components are made based on CMOS technology. The quality of the CMOS technology based equalizer filter is illustrated in the eye diagrams shown in FIG. 9a and FIG. 9b for signals passing a coax of 50 m and 1 m respectively. The measured attenuation by a network analyser of this 50 m cable at 750 MHz is −10 dB. The eye diagrams are shown for a CMOS equalizer filter having four amplifying compensation gain stages operating at 1.5 Gbps, a limiting amplifier and an output driver. The compensation is fixed to about 10.5 dB of higher frequency gain, and there is one auto-gain loop that drives the gain control signals for all the stages in parallel. The eye diagram restored by the equalizer for a signal passing a coax of 50 m is shown in FIG. 9a, showing very little jitter. The original signal at the input of the equalizer filter corresponds with the eye diagram shown in FIG. 2a. In FIG. 9b, the eye diagram for a signal passing a coax of 1 m is shown, leading internally to large overcompensation with large overshoot peaks like in simulated FIGS. 3a-3e. Nevertheless, these overshoot peaks are not harmful since they get filtered out by the applied limiting amplifier. The very small increase in jitter demonstrates the overcompensation allowance following the present invention.

In the following explanation, and referring to FIG. 10a, different values for all components and a different bit-rate are used in a more recent CMOS technology for demonstration of high-speed equalization at a bit rate operation of 4-Gbps. The calculations and demonstrations are based on a 180 nm CMOS technology working at a power supply voltage of 1.8 V. By way of example, a set of explicit values for the electronic components are given in Table 3. Other programmable/tuneable amplifying compensation stages are known by the person skilled in the art and can be considered as well for implementing the present invention.

TABLE 3

| Component | Value | Component | Value |
|---|---|---|---|
| resistor R1 | 1.1 kΩ | Transistor M1 | 10 um/0.18 um |
| resistor R20/R22 | 500 Ω | Transistor M2 | 40 um/0.35 um |
| resistor R21 | 1.7 kΩ | Transistor M3 | 10 um/0.18 um |

TABLE 3-continued

| Component | Value | Component | Value |
|---|---|---|---|
| resistor R3 | 8 kΩ | Transistor M4 | 40 um/0.18 um |
| resistor R5 | 8 kΩ | Transistor M6 | 40 um/0.18 um |
| Capacitor C1 | 280fF | Transistor M8 | 2.5 um/0.18 um |
| Capacitor C2 | 100fF | Transistor M9 | 2.5 um/0.18 um |

Figure 10A:
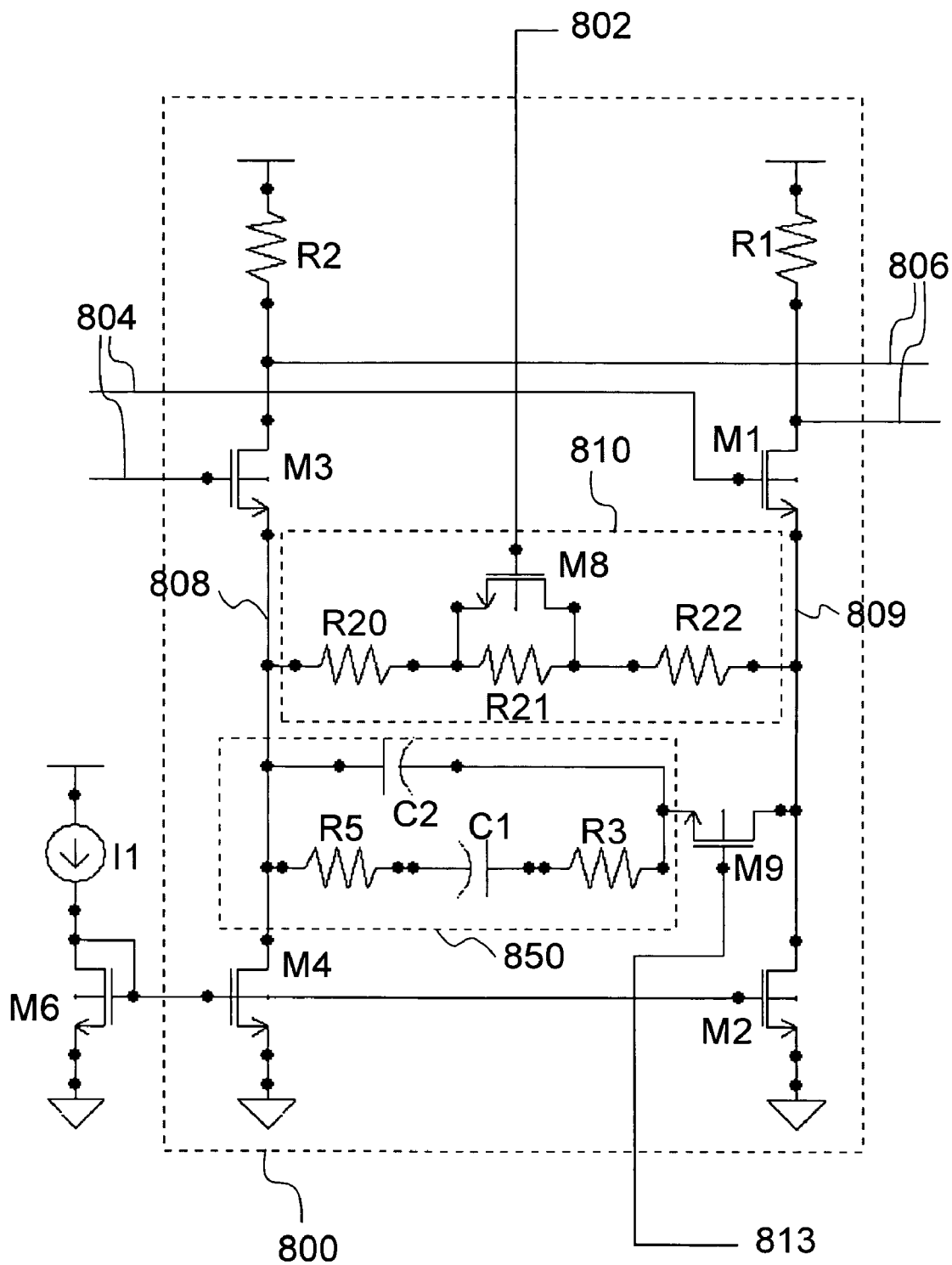
FIG. 10a shows an amplifying compensation stage whereby a first gain input terminal regulates the gain at lower frequency and whereby the higher frequency gain is regulated by an nmos transistor driven by a second gain input terminal.

FIG. 10a illustrates a further embodiment of an amplifying compensation stage 800, which is an alternative for the stage 400 on FIG. 6. The difference between the two embodiments is primarily that a first gain input terminal 802 is connected to a lower frequency gain function circuit 810, while a second gain input terminal 813 is connected to a higher frequency gain function circuit 850. A signal applied to input node 804 will be amplified and output at output node 806, whereby a frequency dependent gain is applied.

When a first gain control signal is applied to the first gain input terminal 802, the lower frequency gain of the amplifying compensation stage 800 may be adjusted. This may be done by applying the gain control signal to a controllable analog switch so as to regulate it, the controllable analog switch e.g. being a transistor M8. The controllable analog switch is a switch with a continuously or quasi-continuously changing value between 0 and 1 (resp. fully open and fully closed). The controllable analog switch thus may be partially open/partially closed, and therefore is called an analog switch, contrary to a digital switch, which would be either in an open state or in a closed state. If the controllable analog switch is coupled in parallel over a resistance with value R21, which resistance is coupled in series with two other resistances R20 and R22, the value of the controllable analog switch brings the total series resistance of lower frequency gain function 810 from a value of (R20+R21+R22) when the switch M8 is fully open, down to a value of approximately (R20+R22) when the switch M8 is fully closed. When the voltage on the first gain input terminal 802 is 0V, the switch, e.g. transistor M8, is open, and for increasing voltages up to the power supply voltage, e.g. 1.8 V, it progressively, i.e. continuously or quasi-continuously, fully closes. In this way, the resistance of the lower frequency gain function circuit 810 can be regulated. This determines the gain at lower frequency of the stage 800.

The values of R20, R21 and R22 may be chosen such that the gain at lower frequencies can be regulated in a range of e.g. −1.5 to +1.5 dB. Depending on the specific application needs, this range may be chosen differently. It is also possible to leave out the resistors R20, R21 and R22, and directly connect the continuously varying analog switch, e.g. transistor M8, between nodes 808 and 809. This would cost less substrate area, e.g. Si area, for implementing the resistors, but it is at the expense of linearity and it lowers regulating stability and can give start-up difficulties under certain circumstances.

The amplifying compensation stage 800 further has a programmable and/or tunable higher frequency gain function circuit 850 comprising two resistors, i.e. resistor R3 and resistor R5, and a capacitor C1 coupled in series, which series connection is coupled in parallel to capacitor C2. By turning on a switching element in series with the higher frequency gain function circuit 850, e.g. transistor M9, the circuit elements grouped as gain function circuit 850, become connected between the sources of transistor M1 and transistor M3, leading to higher frequency gain at the output node 806. When the switch coupled to the higher frequency gain function circuit 850 is open, e.g. transistor M9 is not conducting, by driving it by means of a second gain control signal on second gain input terminal 813, the higher frequency gain disappears. This higher frequency gain operation is similar to that of amplifying compensation stage 400 as illustrated in FIG. 6. Although transistor M9 is called a switch, it may be driven with intermediate voltage values, generating a switch that can be partially open/closed as well, thus forming what is called above an analog switch.

Figure 10B:
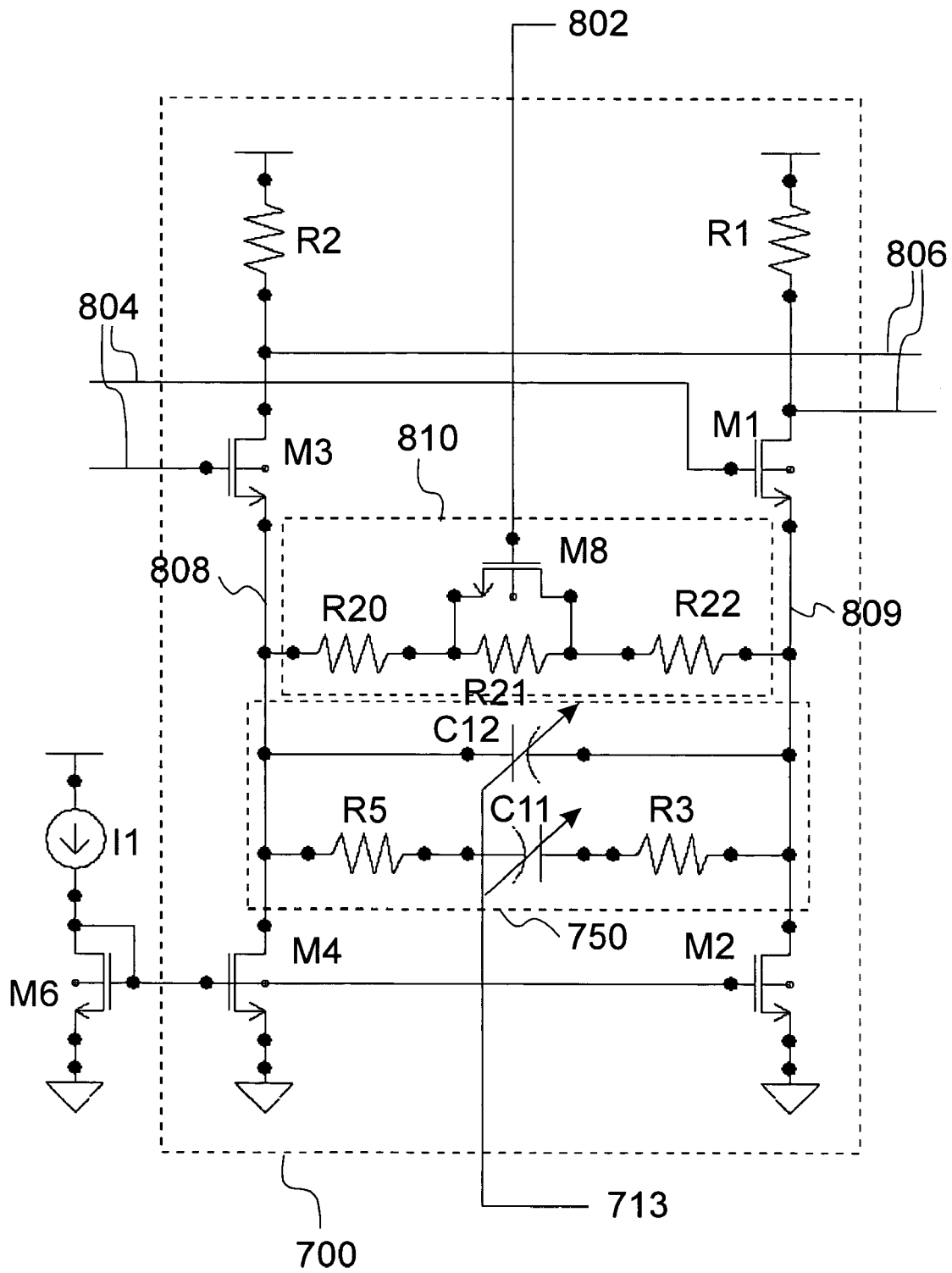
FIG. 10b shows an amplifying compensation stage whereby a first gain input terminal regulates the gain at lower frequency and whereby the higher frequency gain is regulated by two varactors that are driven by a second gain input terminal.

FIG. 10b illustrates another embodiment of an amplifying compensation stage 700, whereby the gain at lower frequency is similar to that of FIG. 10a, and consequently the circuit implementation is the same or analogous, but whereby the higher frequency gain is regulated by a higher frequency gain function circuit 750 which, rather than being connected between the nodes 808, 809 over an analog switch as transistor M9 in FIG. 10a, now comprises varactors (variable capacitors). In the embodiment illustrated in FIG. 10a, the higher frequency gain function circuit 750 comprises a series connection of a first resistor R5, a first varactor C11 and a second resistor R3. This series connection is coupled in parallel with a second varactor C12. The capacitance values of the varactors is changed by applying a gain control signal to a second gain input terminal 713.

Co-pending patent PCT/EP04/001414 explains how varactors or variable capacitors can be made of inversion type PMOS transistors (based on inversion). Another option is to use NMOS varactors based on depletion, well-known to the person skilled in the art. The advantage of both varactor systems is that the semiconductor technology does not require having a capacitor module, making the solution lower cost. The disadvantage is that varactors have a limited dynamic range, certainly when operating at a reduced power supply voltage. A capacitance modulation of a varactor between e.g. 50 and 140 fF may be feasible, a modulation between 10 and 140 fF is typically impossible.

In the amplifying compensation stage 700 illustrated in FIG. 10b, ideally, varactor C12 would be modulated between 0 and 100 fF by means of a gain control signal on the second gain input terminal 713, and varactor C11 would be simultaneously modulated between 0 and 280 fF.

Figure 11:
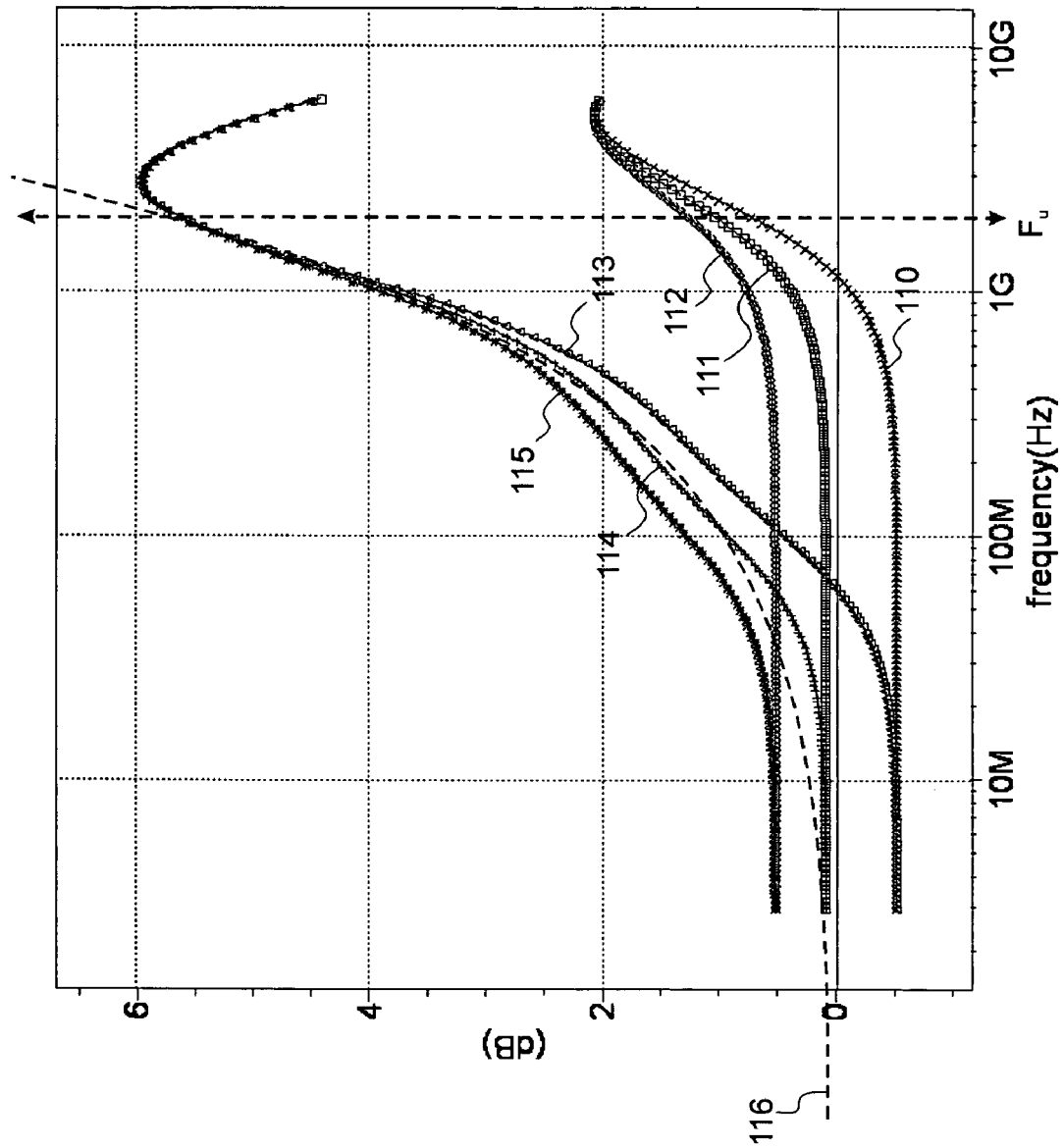
FIG. 11 shows the influence on the gain of the applied voltages on the first and the second gain input terminals, in function of the frequency curves of the amplifying compensation stage and a target gain curve.

FIG. 11 shows the gain in function of the frequency of amplifying compensation stage 800 illustrated in FIG. 10a, for a voltage on the first gain input terminal 802 of 1V (curves 110 and 113), 1.1V (curves 111 and 114) and 1.2V (curves 112 and 115) respectively. Curves 113, 114 and 115 are for turned ON higher frequency gain (i.e. a voltage of 1.8 V being applied to second gain input terminal 813), while curves 110, 111 and 112 are for the higher frequency gain function circuit 850 being turned OFF (voltage on second gain input terminal 813 being 0V). This demonstrates the effect of different voltages at the first gain input terminal 802. For the voltages of 1V, 1.1V and 1.2V respectively, −0.5 dB, 0.1 dB and 0.55 dB of gain is obtained at frequencies below 30 MHz. If there is no higher frequency gain, i.e. the gain control signal applied to the second gain input terminal 813 is low, then the amplification remains at this level up to 1 GHz, where the amplification slightly increases (up to about 1 dB at the upper data frequency $F_u$ of 2 GHz for the given target bit rate of 4 Gbps) due to remaining parasitic capacitance on the nodes 808 and 809.

In order to make this amplifying compensation stage 800 a stage that has good equalizing properties, the values of the resistor and capacitor components are to be thoughtfully chosen. A way to proceed for making these choices may be the following. First the gain input voltage at the first gain input terminal 802 must be set preferably in the middle of its regulation range, such that there is a possibility for a considerable change in lower frequency amplification gain in both directions, i.e. when increasing and decreasing the voltage on the first gain input terminal 802. In an implementation of the present embodiment, a voltage of 1.1V has been chosen and the higher frequency gain function circuit has been turned ON, yielding curve 114 in FIG. 11. Subsequently, the loss curve of a target transmission channel has to be inverted into a target amplification curve (curve 116 in FIG. 11, in case of RGU coax). Thereby the length of the cable has to be tuned such that the achievable amplification at the upper data frequency $F_u$ matches the loss of the cable (in the present example illustrated in FIG. 11 there is about 5.5 dB of gain at $F_u$). Then the values of the components of the higher frequency gain function circuit 850, i.e. in the example given capacitance of capacitor C1, capacitance of capacitor C2, resistance of resistor R3 and resistance of resistor R5, have to be chosen to maximally achieve a good fit between curves 116 and 114. Hereby R3 may be taken equal to R5 or R3 and R5 can be taken as a single resistor. The result, as shown in FIG. 11 is that curves 116 and 114 match relatively well up to the upper data frequency $F_u$. The difference between those curves in the example given is less than +/−0.3 dB, which is a sufficient match in most applications.

Thus, in case the switch for switching higher frequency gain function circuit 850 ON or OFF is closed, thus the switch is ON, e.g. transistor M9 conducts fully, matching is achieved between a certain length of the target transmission channel and the compensation of the amplifying compensation stage 800. However, when having an intermediate tuning value or frequency gain control signal (of e.g. 1V) on the second gain input terminal 813, i.e. the switch is not completely ON nor completely OFF, a non-ideal, non-linear, large signal transfer, depending on the input signal (as well on its differential as on its common mode components) will occur. Fortunately, by limiting the target amount of higher frequency gain compensation to a value of about 5 dB per stage, and by keeping low the number of stages that is in this intermediate condition, preferably only one, the resultant effect of this non-linear non-ideal behaviour remains limited and this will result in an acceptable limited additional jitter. This is in more detail explained in co-pending patent PCT/EP04/001414.

For determining the capacitance values of variable capacitors C11 and C12 in the varactor type of amplifying compensation stage 700 as illustrated in FIG. 10*b*, an analogous procedure holds, and the same values can be implemented. The maximum values of varactors C12 and C11 may be same as the capacitance values of C2 and C1 respectively.

Figure 12:
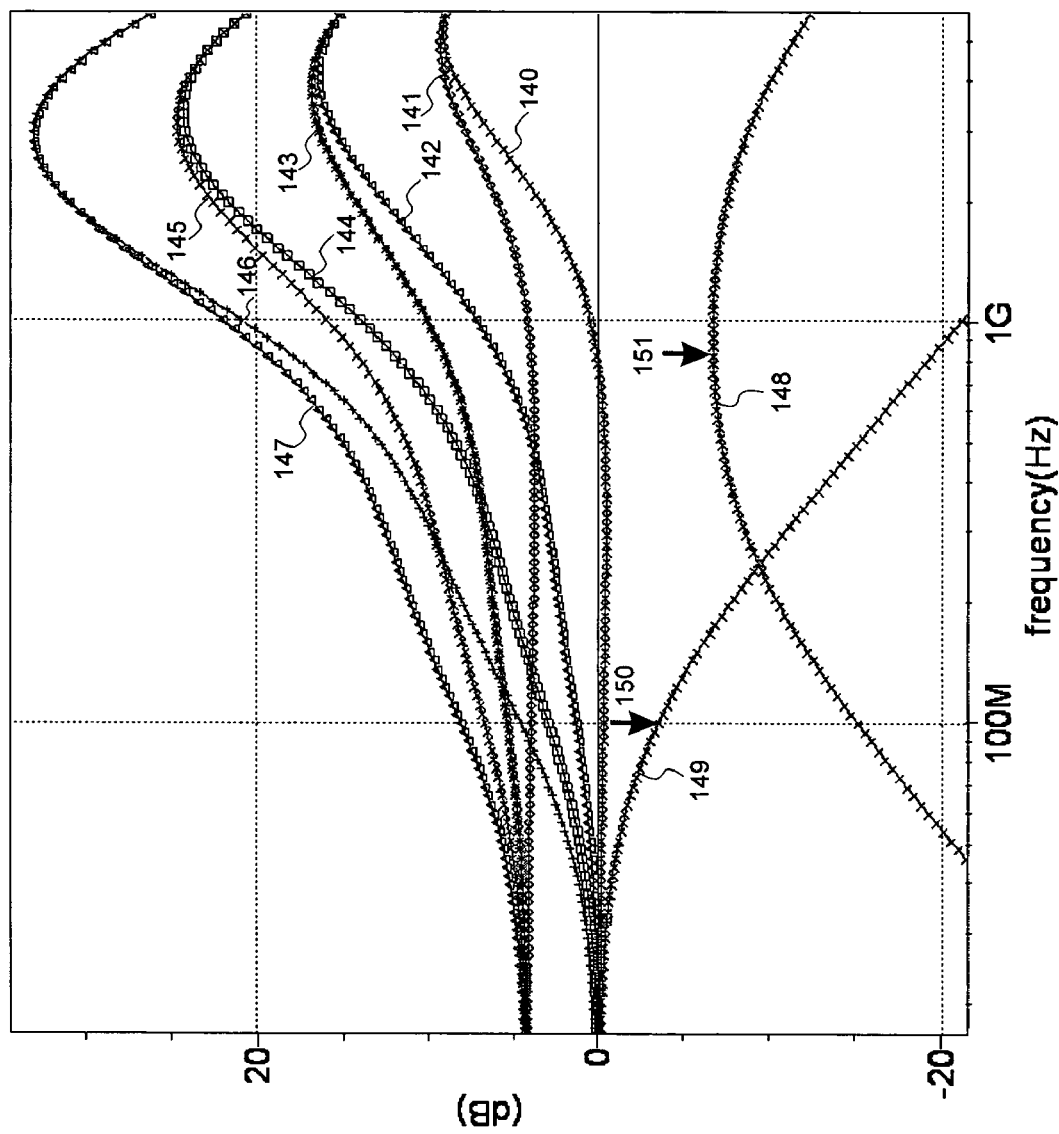
FIG. 12 shows gain versus frequency curves of the amplifying compensation stage together with low pass and band pass filter curves respectively.

FIG. 12 shows the overall gain curve of a cascade of 6 amplifying compensation stages 800, one of which is illustrated in FIG. 10*a*, whereby the first gain input terminals 802 are connected together and driven at a voltage of 1.1 V, i.e. each amplifying compensation stage receives a same gain control signal, yielding curves 140, 142, 144 and 146, and at 1.3 V yielding curves 141, 143, 145 and 147. In the case of curves 140 and 141, the higher frequency gain is turned OFF in all 6 stages. Curves 142 and 143 show the case whereby the higher frequency gain is turned ON in 2 stages, curves 144 and 145 is for the case whereby the higher frequency gain is turned ON in 4 stages, and curves 146 and 147 is whereby all 6 stages' higher frequency gain is turned ON. Further are shown a low-pass filter curve 149, having its −3 dB point 150 at 100 MHz, and a band-pass filter curve 148 having its centre frequency 151 at 800 MHz. These filtering characteristics are used in adaptive equalizer circuit illustrated in FIG. 13.

Figure 13:
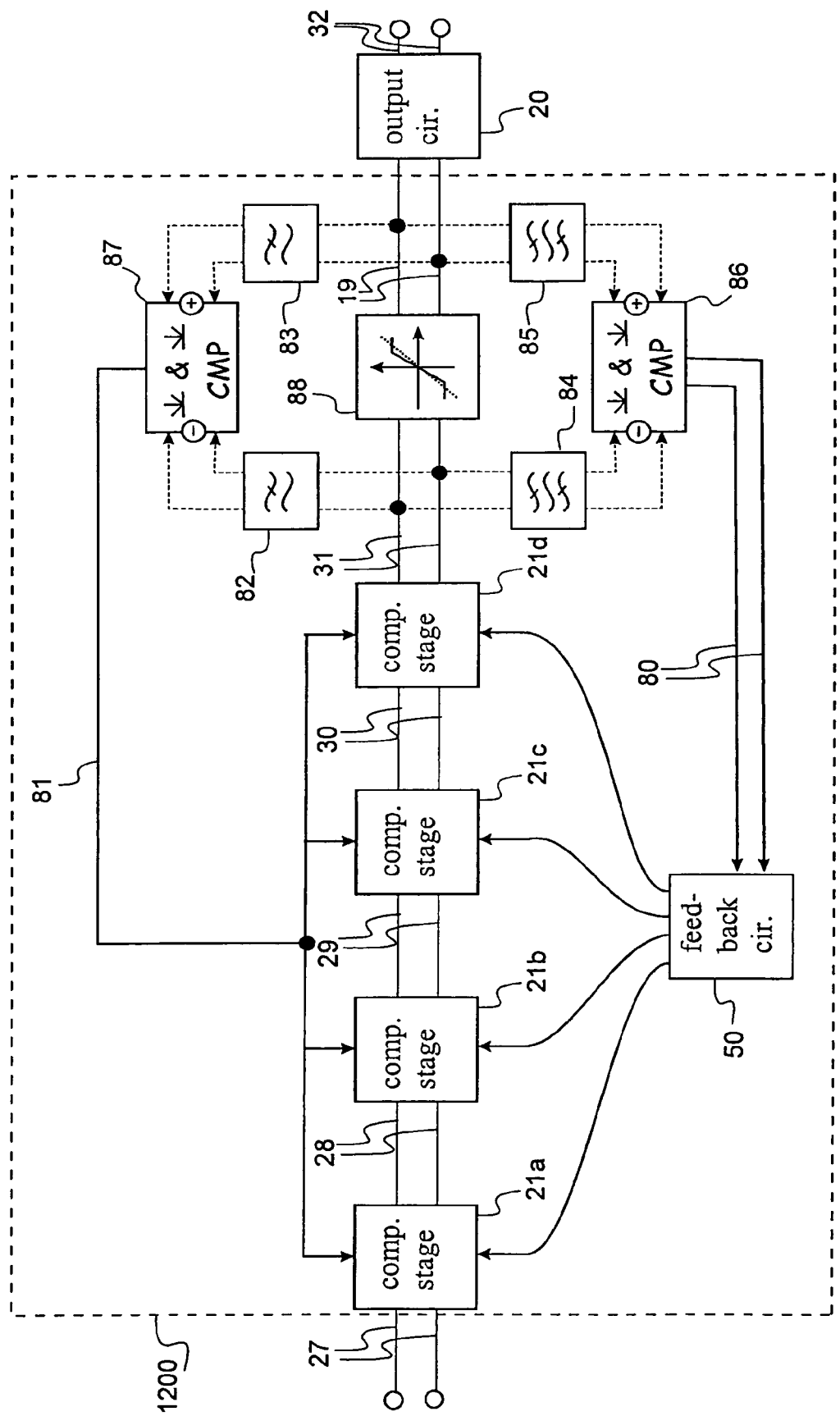
FIG. 13 shows a schematic representation of an adaptive equalizer filter having a second self-adapting compensation control loop according to an embodiment of the present invention.

FIG. 13 shows a schematic representation of a dual loop auto adaptive equalizer 1200 that is more explicit than the one of FIG. 7. The number of shown amplifying compensating gain stages 21*a* . . . 21*d* is 4, but can be less or more in reality. As mentioned earlier, in the present simulations a cascade of 6 such stages is used. Limiting amplifier 88 amplifies and/or digitizes the output 31 of the last amplifying compensation stage 31. This circuit 88 has itself a fixed maximum output amplitude, in the example of e.g. 750-mV. Two low-pass filters 82 and 83 filter the input 31 and the output 19 of the limiting amplifier 88 respectively. Two bandpass filters 84 and 85 filter the input 31 and output 19 of the limiting amplifier 88 respectively. The filtering characteristics of the low-pass filters 82 and 83 are as shown by curve 149 in FIG. 12. The filtering characteristics of the band-pass filters 84 and 85 are as shown by curve 148 in FIG. 12.

The differential outputs of low-pass filters 82 and 83 are compared by differential rectifying comparator 87, thus generating a voltage on node 81. Node 81 drives the gain control signals on the gain input terminals of all amplifying compensation stages 21*a*, 21*b*, 21*c*, 21*d*. When the low frequency components in the signal on node 31 (that is the input to the limiting amplifier 88) are too low with respect to the signal that comes out of the limiting amplifier 88 on node 19, then the rectifying comparator 87 will increase the voltage on node 81 such that the gain at lower frequency will be raised. Conversely, when the low frequency components in the signal on node 31 are too high with respect to the signal that comes out of the limiting amplifier 88 on node 19, then the rectifying comparator 87 will decrease the voltage on node 81 such that the gain at lower frequency will be decreased The differential outputs of band-pass filters 84 and 85 are compared by rectifying comparator 86, thus generating a signal 80 that communicates to feed-back circuit 50 to increase or decrease the higher frequency gain. Feed-back circuit 50 drives the higher frequency gain inputs of all amplifying compensation stages 21*a*, 21*b*, 21*c*, 21*d*. When the high frequency components in the signal on node 31 (that is the input to the limiting amplifier 88) are too low with respect to the signal that comes out of the limiting amplifier 88 on node 19, then the rectifying comparator 86 will communicate to feed-back circuit 50 that the higher frequency gain has to be raised. Conversely, when the high frequency components in the signal on node 31 are too low with respect to the signal that comes out of the limiting amplifier 88 on node 19, then the rectifying comparator 86 will communicate to feed-back circuit 50 that the higher frequency gain has to be decreased.

Feed-back circuit 50 is a circuit that has several outputs determining which of the connected amplifying compensation stages 21*a*, 21*b*, 21*c*, 21*d* will have its higher frequency gain function circuit 850 turned ON or OFF and of which of those amplifying compensation stages 21*a*, 21*b*, 21*c*, 21*d* the higher frequency gain function circuit 850 is in a state in between ON and OFF. An example of such circuit is in more detail described in co-pending patent PCT/EP04/001414. The simplest and most effective version is the one whereby the stages get consecutively turned ON, one after the other for an increasing demand of higher frequency gain amplification. In that way, the data signal that is travelling through the set of cascaded stages, will encounter first the stages that are having their higher frequency gain functions 850 turned ON, then that one stage that is possibly having its higher frequency gain function 850 in an intermediate state, and then the remainder of the stages having their higher frequency gain functions 850 in the OFF state. From a signal to noise perspective it is always better in an amplification chain to start with as much amplification as possible. Therefore this is also the preferred choice.

The position of the −3 dB point of the low pass filters 82, 83 is chosen such that the signal that comes out of these filters is mostly affected by frequency components that get tuned by the lower frequency gain control signal, and less by frequencies of which the gain is affected by the higher frequency gain control signal. Similarly the pass band of filters 84 and 85 is chosen such that the signal that comes out of these filters is mostly affected by frequency components that get tuned by the higher frequency gain control signals, and less by frequencies of which the gain is affected by the lower frequency gain control signal. In that way, both loops can more or less converge independently to their end value. There is some interference between both regulation loops, however, this will not lead to instability if done properly (like is proposed here), and at the end, the loops converge to an end value. At convergence point, the resultant gain curve should be more or less fit the desired gain curve being the complement of the channel loss that was to be compensated. Indeed, by assuring that the signal components at lower and at higher frequencies become matching, the curves can only differ in the mid-frequencies. However by making curves 116 and 114 (FIG. 11) substantially match by construction over the whole frequency range for a given value of the gain input, the difference at the mid-frequencies will be relatively small, when at convergence point the gain input may end up to be slightly different.

In the above, it is proposed to use low-pass filters for filters 82 and 83, however, in an alternative embodiment it is as well possible to use a band-pass filter, e.g. with an extra −3 dB point at 1 MHz. Similarly, for the filters 84 and 85 it is proposed in the above to use band pass filters, however high-pass filters will work as well, e.g. with a −3 dB point at 300 MHz.

For many applications the dual loop as presented in FIG. 13 can be sufficient. An output circuit 20 can still be used for making the signal on the output node 19 of the limiting amplifier 88 somewhat more digital and/or for bringing the output voltage and impedance to their specified levels on output node 32.

In the given circuit 1200 of FIG. 13, it is assumed that the lower frequency gain control signals to the amplifying compensation stages are driven in parallel, in other words, a single voltage is determining the gain at lower frequencies for all stages 21a, 21b, 21c, 21d at once, determining the overall gain of the cascade of amplifying compensation stages. At this gain input side however, a consecutive switching-ON strategy may be considered as well using a circuit similar to feed-back circuit 50. There may be an advantage in signal to noise ratio, but one has to check whether no high-speed signaling nodes get into saturation.

On the other hand, one can also consider driving the higher frequency gain inputs with the same signal or voltage, instead of with a system of a type with a feed-back circuit 50. In most cases, when using stages of the type as the amplifying compensation stages 800 in the cascade chain of stage 21a, 21b, 21c, 21d this will not yield good performance. When, however, implementing the varactor type of amplifying compensation stage 700, there is a chance that sufficient, although only moderate performance can be reached. Varactors have a capacitance value that is depending on the signal that it is carrying, and possibly, when keeping the general signal amplitudes low, one will not suffer too much from the non-linear effects this dependence will be leading to, even in a cascade of stages with simultaneously driven higher frequency gain inputs. In order not to encounter these type of problems the use of sequential turning ON of stages is however preferred, even for the varactor type of amplifying compensation stages 700.

Figure 14:
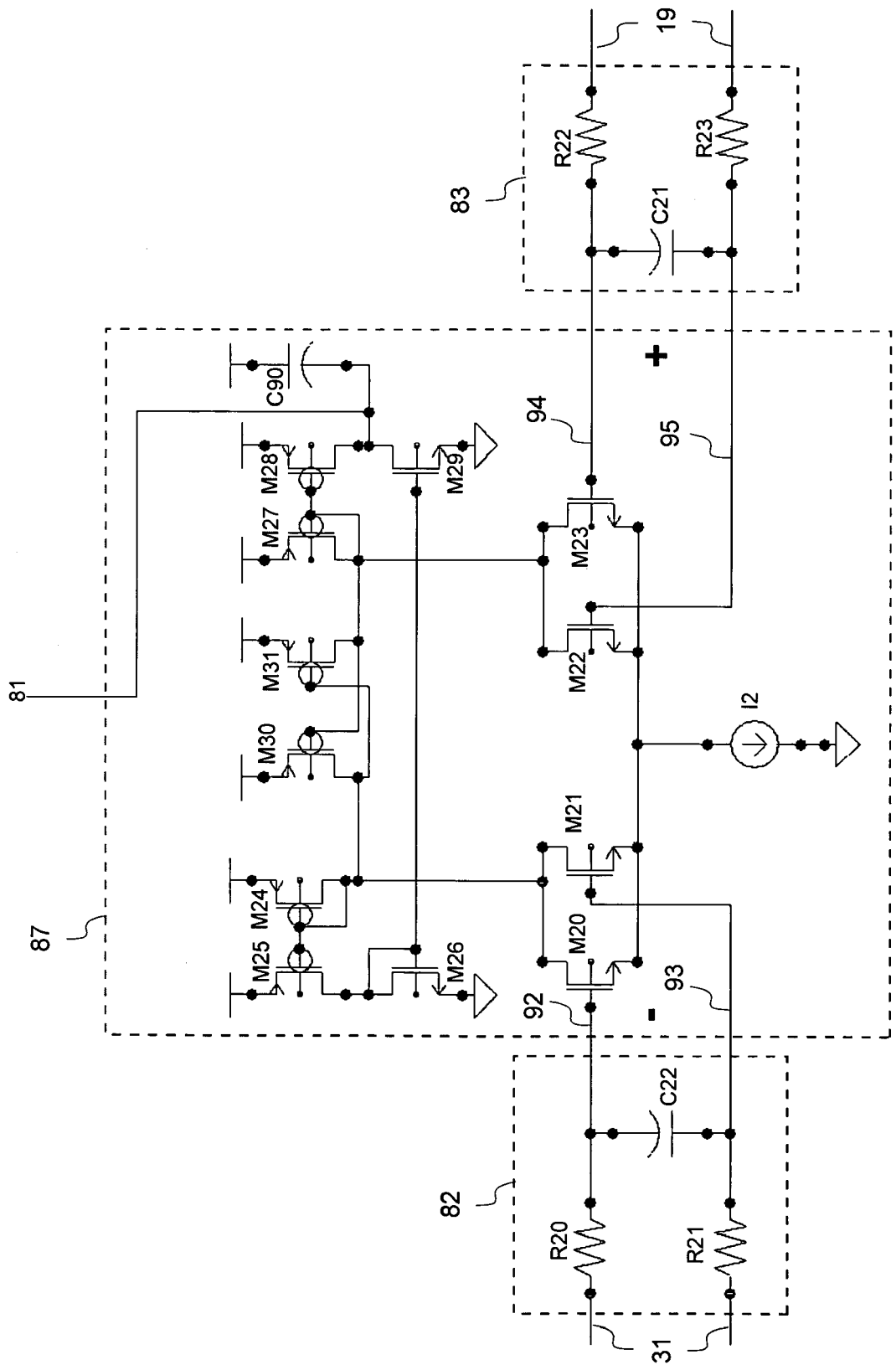
FIG. 14 shows a schematic representation of two low-pass filters connected to a differential rectifying comparator.

FIG. 14 shows an embodiment of filters, e.g. low-pass filters 82 and 83, coupled to a rectifying comparator 87. In the example given, the resistors R20, R21, R22, R23 may have a value of e.g. 30 kΩ and the capacitors C22, C21 may have a value of e.g. 20 fF. Hereby one should also include the parasitic capacitance of the connected gates of transistors M20, M21, M22, M23 of the rectifying comparator 87. FIG. 14 further shows the way signals may be compared with the rectifying comparator 87 according to an embodiment of the present invention, and will be explained below.

In state-of-art equalizers one typically follows a somewhat different principle (see also U.S. Pat. No. 6,304,615). The signals at the outputs of the filters are first rectified, and therefrom one creates subsequently two amplitudes, which thereafter get compared. This is a relatively complex process, in the sense that it requires a relatively large set of transistors, where during the process one heavily counts on transistor matching. Further the intermediate amplitude signal delivers an extra delay, which should be taken into consideration when performing stability analysis. The rectification also assumes signal treatment at a double frequency then the data-frequency.

Figure 15:
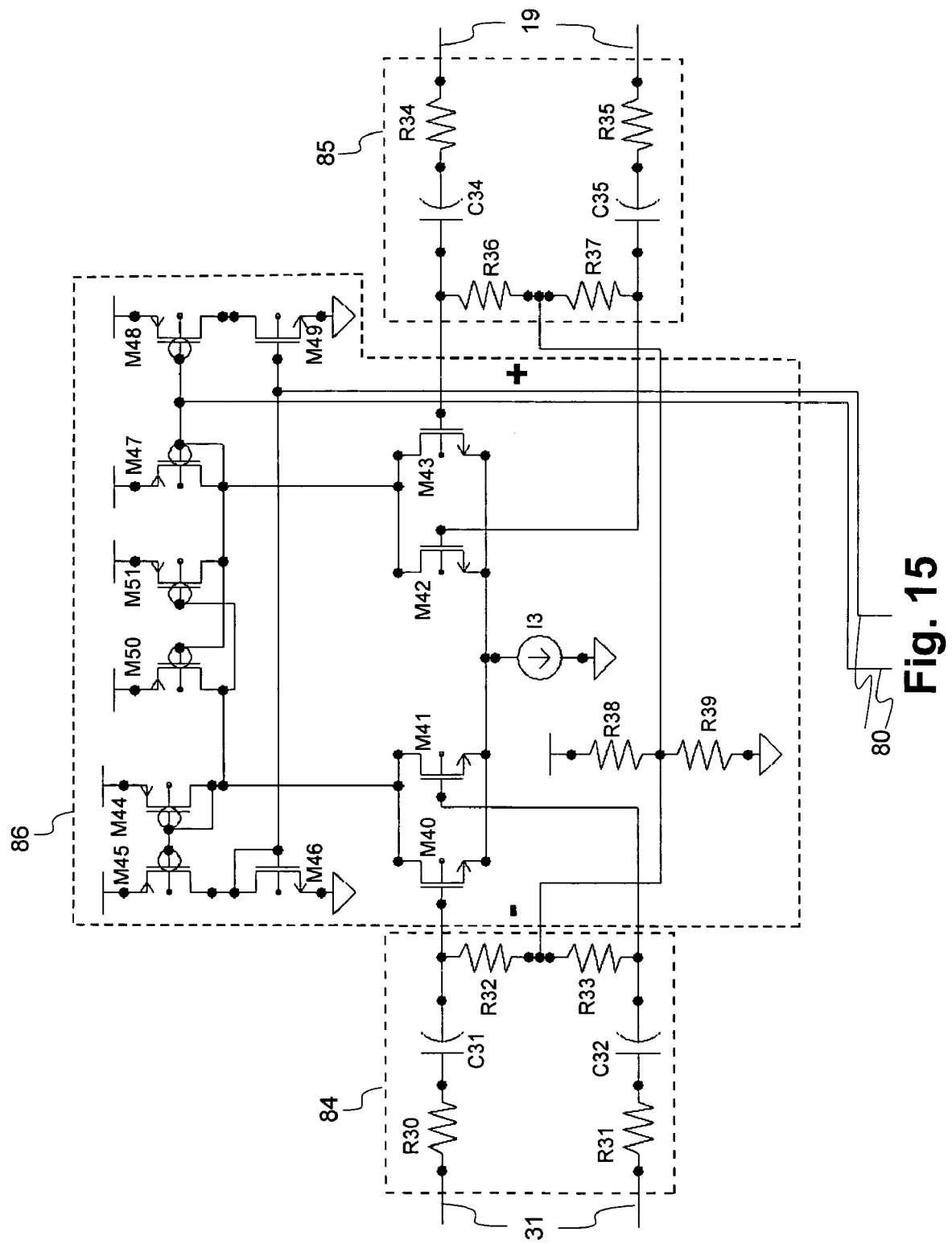
FIG. 15 shows a schematic representation of two band-pass filters connected to a differential rectifying comparator.

The system proposed herewith is the rectifying comparator 87 in FIG. 14 (and also rectifying comparator 86 in FIG. 15). Instead of having one transistor for each input side of the comparator 87, one provides two transistors for each input side. The negative input side has the gate 92 of transistor M20 and the gate 93 of transistor M21 as input terminals, and the positive input has the gate 94 of transistors M22 and the gate 95 of transistor M23 as input terminal. The four input transistors M21, M22, M23, M24 have a common source that is driven by a current source 12. This way of comparing two differential signals is very fast, has little offset and is inherently rectifying. The offset is determined mainly by the matching between transistors M20, M21, M22 and M23. The width W of these transistors should be taken as large as possible, for improving the matching of these transistors, with small length L for still being fastly responsive. As an example of a design these transistors may have W=20 um and L=180 nm.

The remainder of the comparator 87 may be like any other comparator and can be designed by a person skilled in the art. In the given schematic of FIG. 14, transistors M24, M25, M26, M27, M28, M29, M30, M31 constitute the remainder of the comparator. This part of the comparator may be low-speed, relaxing the conditions for achieving little input equivalent offset due to transistors mismatches in this part of the circuit. For achieving enough gain a positive feedback is included by including transistors M30 and M31 in a cross-coupled relationship. A dual stage comparator may also be implemented to increase the gain (not illustrated in FIG. 14). The output node 81 drives the gain inputs of the cascade of stages 21a, 21b, 21c, 21d, and forms the dominant pole in the loop. The capacitor C90 partly determines the time constant that regulates that loop.

An analogous way of differential comparison with inherent rectification may be used in the rectifying comparator 86 after filters, e.g. band-pass filters 84 and 85, as illustrated in FIG. 15. Resistors R30, R31, R34 and R35 may have a value of e.g. 5 kΩ and resistors R32, R33, R36 and R37 may have a value of e.g. 10 kΩ. Capacitors C31, C32, C34 and C35 may have a value of e.g. 30 fF. Since capacitors C31, C32, C34 and C35 disconnect the DC-level, this DC level has to be restored. This is achieved by generating a voltage with a voltage divider (comprising resistors R38 and R39, each having a resistance value of e.g. 1 kΩ) generating a reference voltage value of e.g. 900 mV, and supplying this reference voltage to the common nodes between resistors R32 and R33 and between resistors R36 and R37. The subsequent rectifying comparator 86 can be completely the same as the rectifying comparator 87 illustrated in FIG. 15, however here a signal 80 is exported to communicate to the feed-back circuit 50 whether there must be more or less higher frequency amplification.

Figure 16:
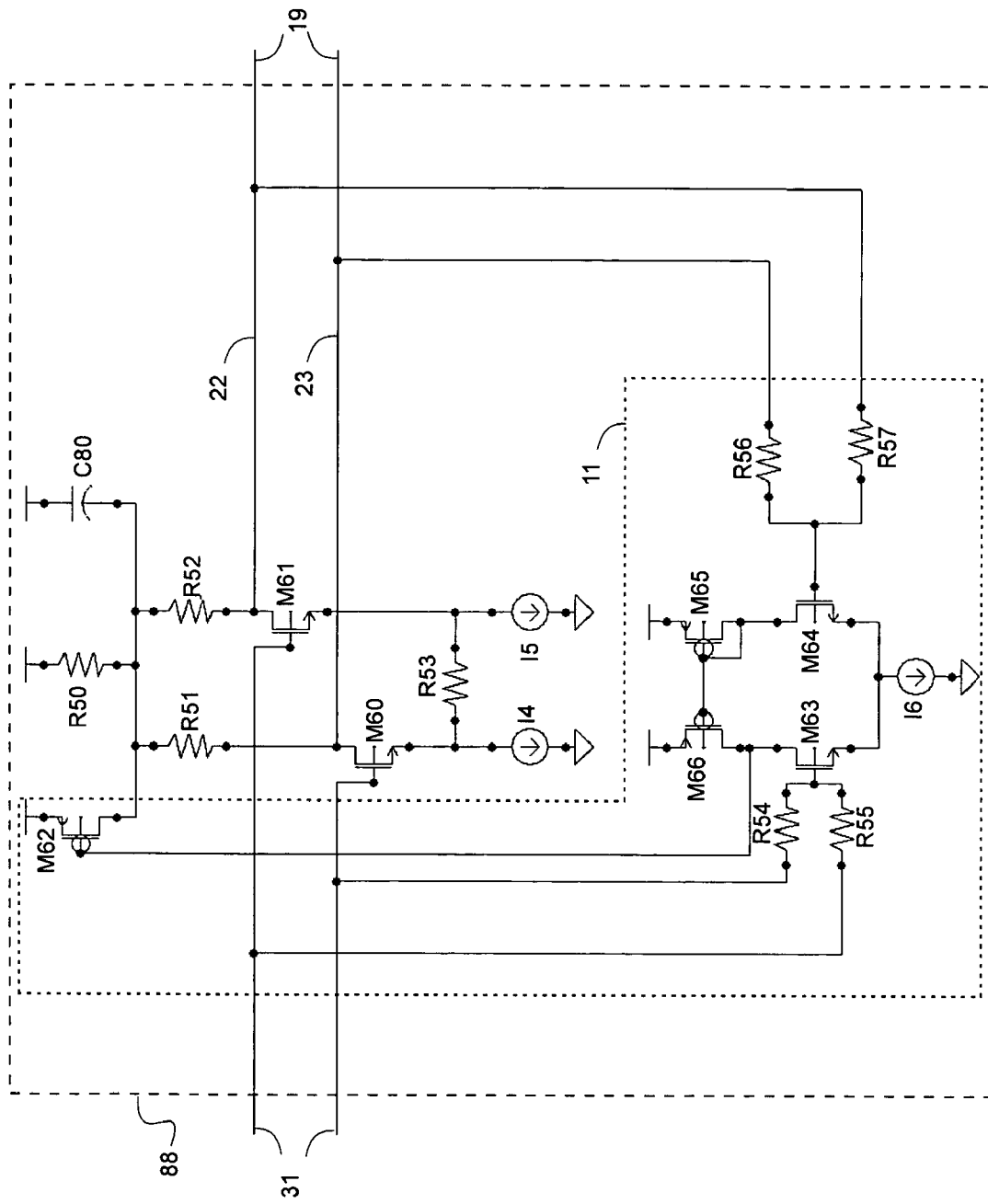
FIG. 16 shows a schematic representation of a limiting amplifier.

FIG. 16 is a schematic representation of a limiting amplifier 88. Conventional limiting amplifier circuits comprise comparators, bit-slicers, signal restorers, and signal quantizers. These circuits convert an analog input signal at node 31 into a digital output signal at node 19. A positive differential input signal voltage is hereby amplified to one digital state, and a negative input signal voltage is hereby amplified to the other digital state. A high gain is assumed to achieve this; otherwise one cannot get a digital output.

The disadvantage of this principle is that it requires at high speed a set of power consuming amplifiers, further delivering very steep edges at the output node 19, which steep edges can be much steeper than the edge steepness of the originally transmitted signal.

Figure 17A:
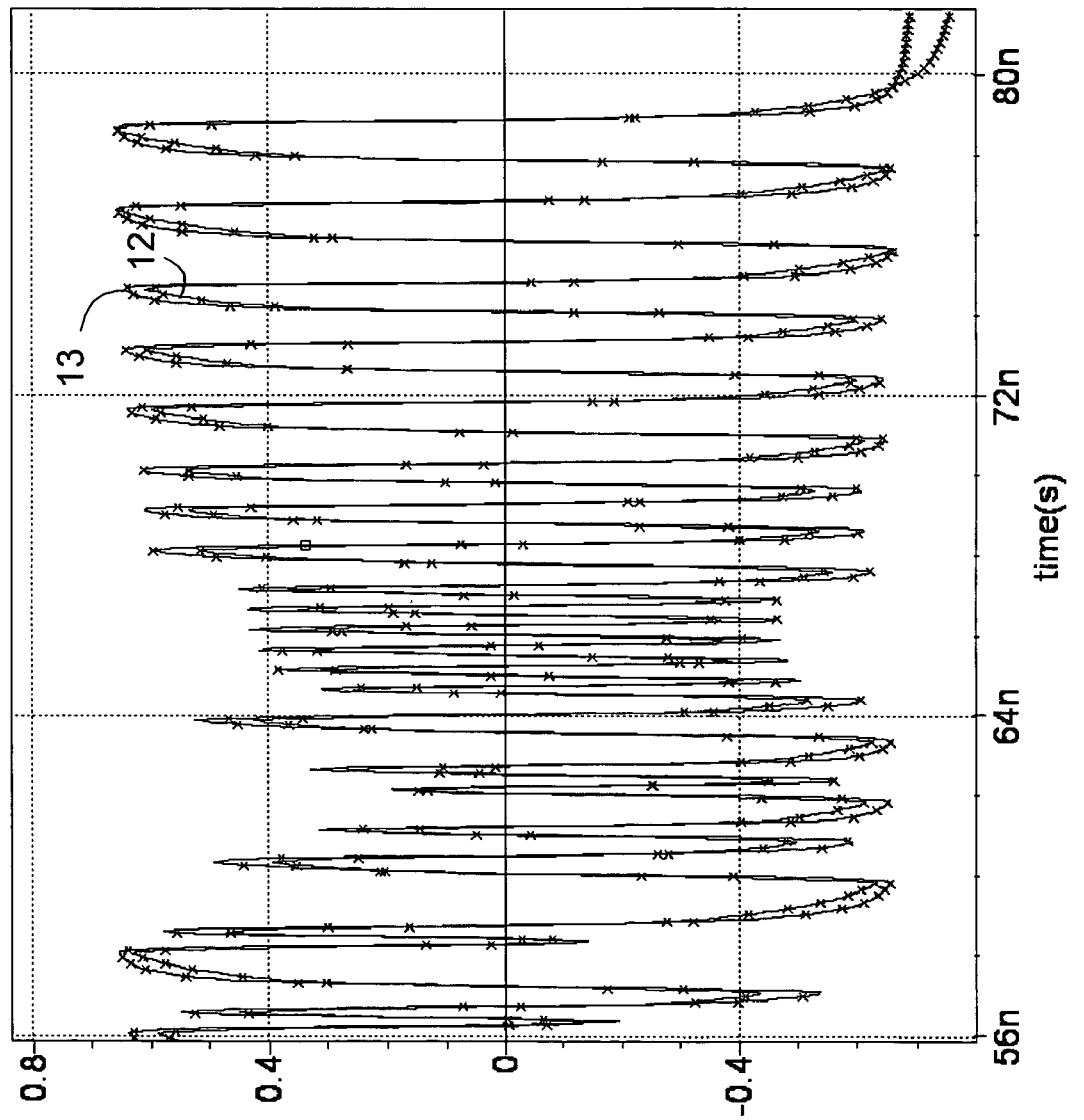
FIG. 17a shows a transient simulation of the input and output of the limiting amplifier of FIG. 16 before convergence of the two loops is achieved.
Figure 17B:
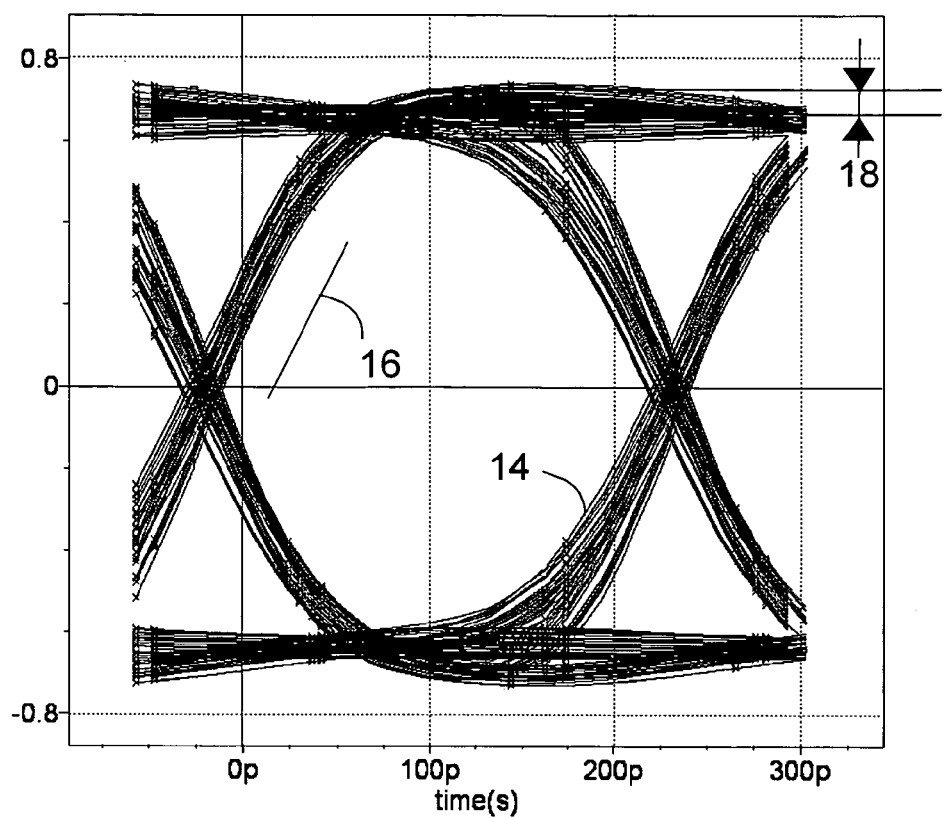
FIG. 17b shows the input eye-diagram at the input of the limiting amplifier of FIG. 16 when the dual loop has reached convergence.
Figure 17C:
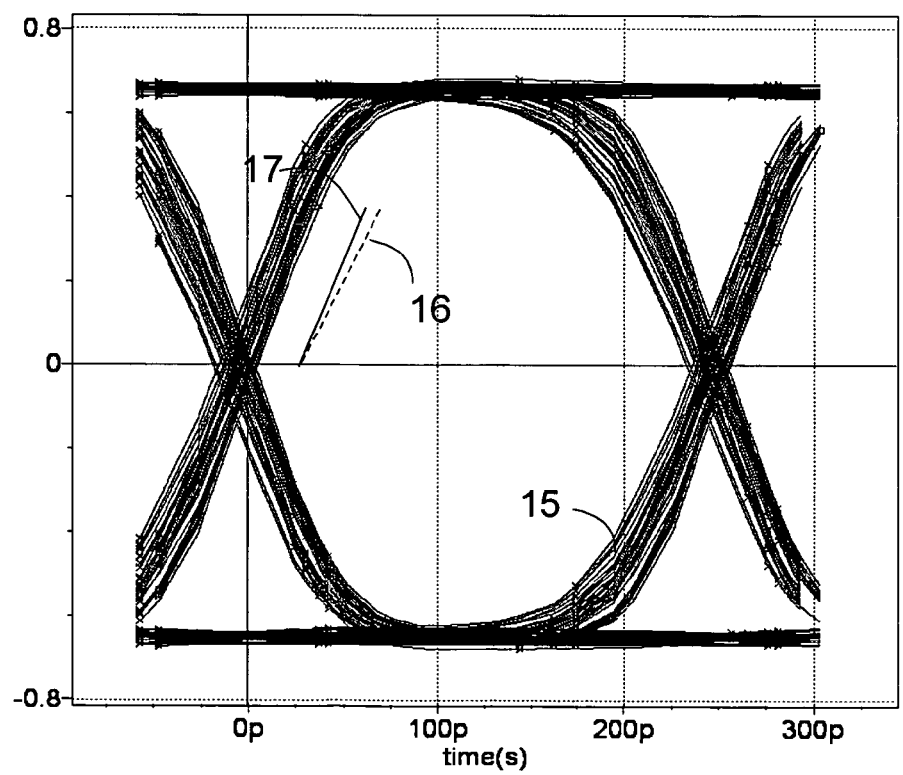
FIG. 17c shows the output eye-diagram at the output of the limiting amplifier when the dual loop has reached convergence.

A preferred principle of the present invention is to limit the amplification gain per compensation stage to a lower value, e.g. below 10 dB, preferably limited to 5 dB in the full frequency range at least up to the upper data frequency $F_u$. This amplification saturates at a pre-determined differential voltage depending on the resistor circuit in the limiting amplifier 88, e.g. at a differential voltage of plus or minus 650 mV. One may also refer to this as clipping or limiting amplification. FIG. 17a, shows the input signal 12 at node 31 and the output signal 13 on node 19 before dual convergence, when having a higher frequency gain that is still too small. Since the amplifier 88 is not yet saturated, it can be seen what the amplification factor is for the smaller signal amplitudes. Signal 13 is about 3 dB larger than signal 12 for the part of the signal being smaller than +/−600 mV. The regulating loops will still recognize this difference and will increase the higher frequency gain until saturation is reached and convergence is obtained. FIGS. 17b and 17c show, at the convergence point, the eye diagrams 14 and 15 at the nodes 31 and 19 respectively. Due the small amplification factor, the steepness of the signal edges is only marginally increased going from eye 14 to eye 15, indicated by line-pieces 16 and 17. Line piece 16 is repeated in FIG. 17c with same angle as in FIG. 17b for demonstrating the limited increase in edge steepness. This limited steepness increase is largely determined by the gain of the amplifier. By keeping the gain low, the increment in steepness remains limited. By having a limited increment in steepness, the end point convergence will automatically limit the overcompensation leading in eye 14 to a limited overshoot indicated by 18. This limited overshoot 18 (in the example given about 1.5 dB) is a good target value for overcompensation, leaving a compensation margin in both directions. When at the transmission side a signal transmitter is used that has slow rising and falling edges, then eye 14 will have similar slow rising and falling edges at the compensation level whereby minimal jitter is reached. Slow rising and falling edges are used more often due to the reduced radiation emission.

In order to achieve a differential amplifier that has a controlled gain of e.g. 3 dB and in order for amplification to saturate at a given voltage level, the implementation of a limiting amplifier 88 as in FIG. 16 may be used. Part 11 of this circuit is a low-speed common mode regulator that regulates that the output common mode voltage at output node 19 becomes the same as the input common mode voltage at input node 31. This is required for rectifying comparator 87 to be able to properly compare the low frequency components. The remainder of the limiting amplifier circuit 88 is for amplifying the differential part of the incoming signal. Transistors M60 and M61, connected on the input line between the input node 31 and the output node 19 can be regarded as voltage followers, generating a difference current through resistor R53, coupled between the sources of transistors M60 and M61, which difference current is in proportion to the differential voltage applied at input node 31. This difference current will be conducted through transistors M60 and M61, together with their biasing currents I4 and I5. The current difference will generate over resistors R51 and R52, each coupled in series with the drain of one of transistors M60, M61, a difference in voltage, that becomes the difference at the output of the amplifier at node 19. At a too large input voltage the system will saturate at a given output voltage. A person skilled in the art can easily determine the obtained amplification factor and saturation level. Resistor R50, coupled in series with a parallel connection of two branches, each branch comprising a series connection of a transistor M60, M61 and a resistor R51, R52, is present in order to obtain that the top of the eye diagrams on the single endednodes 22 and 23 of output node 19 have an offset (here about 300 mV) from the power supply voltage, e.g. 1.8 V, in other words to keep the common-mode level at about 1.1V in the present example. In the present example, as an example only the following values may be used:

R53=100 Ω,

R51=R52=550 Ω,

R50=275 Ω,

C80=100 fF, transistors M60 and M61 having W/L=10 um/180 nm.

Resistors R54 and R55 of the low-speed common mode regulation circuit measure the input common mode at the input node 31, resistors R56 and R57 of the low-speed common mode regulation circuit measure the output common mode at the output node 19, and with a negative feedback loop the gate voltage at transistor M62 is regulated such that the output common mode is the same as the input common mode voltage (being about 1.1V in the present example). As an example, the resistors in the low-speed common mode regulation circuit may e.g. have a resistance value R54=R55=R56=R57=10 kΩ. The circuit 11 is non-critical and can operate in a low-speed mode.

An alternative arrangement is whereby (not shown) the amplification of the limiting amplifier 88 has about a unity amplification, so an amplification of 0 dB up to a saturation or clipping level (e.g. 650 mV in the example). This makes the edges' steepness of the differential signal before and after the limiting amplifier substantially the same. In that case a controlled offset in the comparators 86 and 87 may be built in, such that due to positive feedback the gain and the compensation level will grow until the signal at the input of the limiting amplifier will be exceeding the signal at the output of the limiting amplifier by about this built in offset voltage. This can e.g. be achieved by increasing the width W of transistors M22 and M23 in comparator 87 and M42 and M43 in comparator 86 by 10 to 20%. By increasing the offset more in comparator 86 for the higher frequencies than in comparator 87 for the lower frequencies, a controllable overcompensation may be targeted. This arrangement of unity amplification is especially useful in cases whereby a high compensation level has to be reached and whereby the signal at the entrance of the limiting amplifier is not likely to have steep edges.

The dual loop adaptive equalizer filter 1200 as illustrated in FIG. 13 can handle different transmit amplitudes, e.g. in a range of a factor of two in amplitude (6 dB range). Also, to some extent it can handle a set of different types of transmission channels having a somewhat different attenuation characteristic as the one used for calibrating the internal gain amplification stage 800.

For cable attenuation typically two loss mechanisms exist: there are dielectric losses and skin-effect losses. Typically newer types of cable use different dielectrics, generating less dielectric loss. The associated attenuation curve can hereby become relatively different. Cat6 cable for example has a loss characteristic different from the one of Cat5 cable.

At the level of printed circuit boards, including the ones in FR4 (epoxy laminate), one typically has different loss mechanisms for different loss origins. Beside the skin-effect and dielectric losses, also a PCB-via generates losses, a wire bond generates losses, a connector generates losses, trace bends generate losses etc. . . . Equalizing a PCB transmission channel is therefore a more difficult task to fulfil.

Figure 18A:
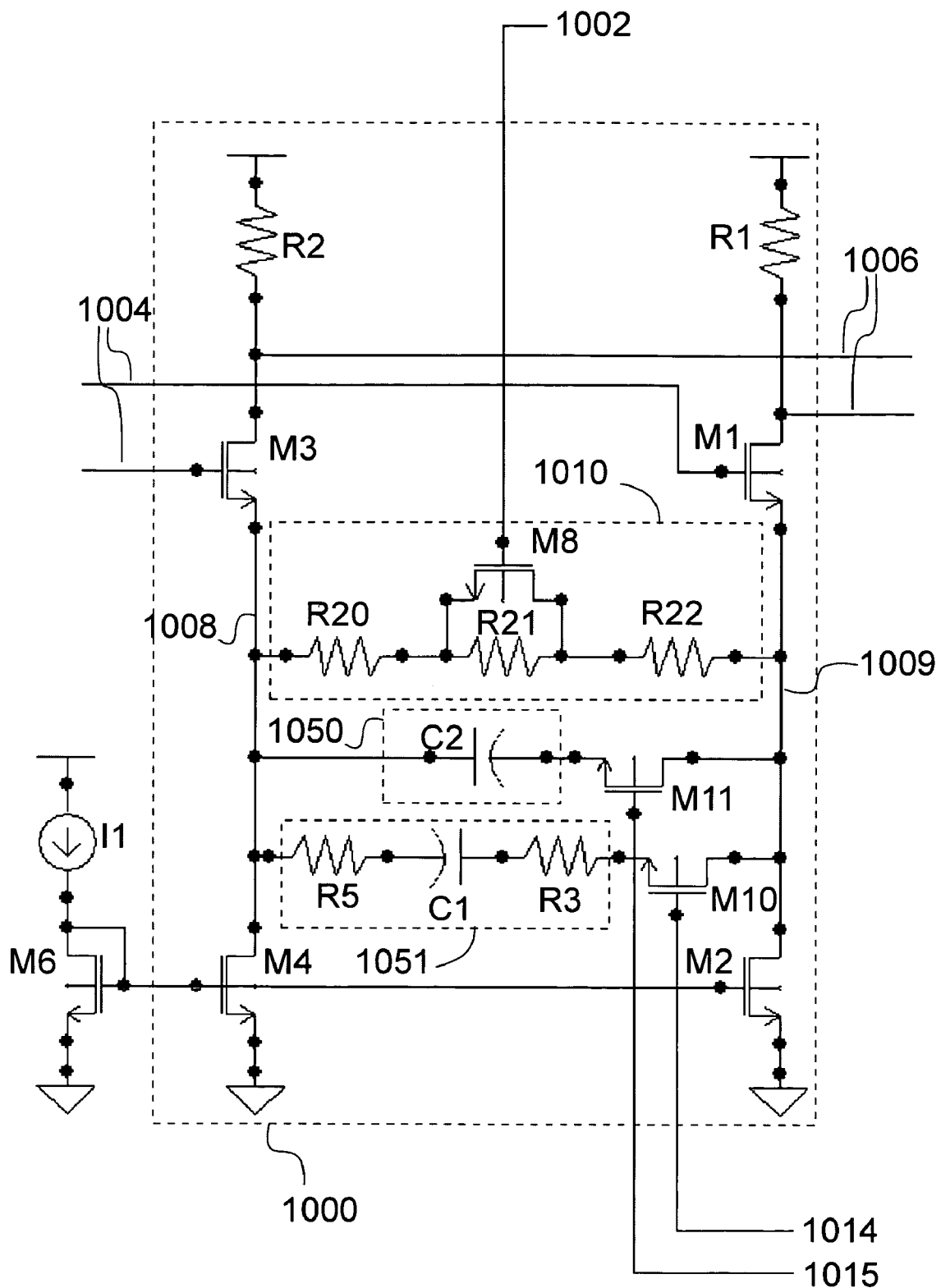
FIG. 18a shows an embodiment of an amplifying compensation stage with a first gain input terminal for low frequency regulation, a second input terminal for mid-frequency gain regulation and a third input terminal for higher frequency gain regulation, the mid- and higher frequency gain regulation being by nmos transistor switches driven by the signals at the second and third input terminals.

In order to compensate these sets of variable loss curves, in a further embodiment the present invention introduces a triple loop equalizer 1000, for amplifying and compensating for distortions and incoming data signal on input node 1004, and outputting the amplified and compensated data signal on output node 1006, whereby three loops converge to a more or less optimal end-point whereby little jitter will be present in the final output eye-diagram. FIG. 18a is a schematic representation of a triple-loop amplifying compensation stage 1000 that has three parameters to tune: the low frequency gain by a first control signal on a low frequency gain input 1002, for amplifying the signals in a frequency band up to $\frac{1}{15}$ of the upper data frequency, e.g. a frequency band up to 100 MHz; the mid-frequency gain by a second control signal on a mid-frequency gain input 1014, for amplifying signals in a frequency band between $\frac{1}{20}$ and $\frac{1}{2}$ of the upper data frequency, e.g. a frequency band between 100 MHz and 1 GHz, and the higher frequency gain by a third control signal on a higher frequency gain input 1015, for amplifying signals in a frequency band higher than $\frac{1}{5}$ of the upper data frequency, e.g. a frequency band above 400 MHz.

The first control signal on the low frequency gain input 1002 operates in an analogous way for the triple loop amplification compensation stage 1000 as the control signal on the first gain input terminal 802 for the amplifying compensation stage 800. The first control signal on the low frequency gain input 1002 regulates a controllable analog switch, e.g. transistor M8, that brings the total series resistance of lower frequency gain function circuit 1010 from a first value, e.g. (R20+R21+R22), when the switch is fully open, down to a second value, e.g. approximately (R20+R22), when the switch is fully closed.

This determines the gain at lower frequency of the triple loop equalizer stage 1000. The values of the resistive elements, e.g. resistors R20, R21 and R22, in the lower frequency gain function circuit 1010 may be chosen such that the gain at lower frequencies can be regulated in a range of between a first and a second value, e.g. −1.5 to +1.5 dB. Depending on the specific application needs this range may be chosen differently. It is also possible to leave out the resistors R20, R21 and R22, and directly connect the continuously varying analog switch, e.g. transistor M8, between nodes 1008 and 1009. As explained before with respect to a previous embodiment, this would cost less substrate area, e.g. Si area, for the resistors, but it is at the expense of linearity and it lowers regulating stability and can give start-up difficulties under certain circumstances.

The amplifying compensation stage 1000 further has a programmable and/or tunable higher frequency gain function circuit 1050 comprising at least a capacitor C2. By turning on a switching element in series with the higher frequency gain function circuit 1050, e.g. transistor M11, the circuit elements grouped as gain function circuit 1050, becomes connected between the sources of transistor M1 and transistor M3, leading to higher frequency gain at the output node 1006. When the switching element, e.g. transistor M11, is not conducting, the higher frequency gain disappears.

The amplifying compensation stage 1000 further has a programmable and/or tunable mid-frequency gain function circuit 1051 comprising a series connection of at least one resistor, e.g. resistors R5 and R3, and at least one capacitor, e.g. capacitor C1. By turning on a switching element in series with the higher frequency gain function circuit 1051, e.g. transistor M10, the circuit elements grouped as gain function circuit 1051, become connected between the sources of transistor M1 and transistor M3, leading to mid-frequency gain at the output node 1006. When the switching element, e.g. transistor M10, is not conducting, the mid-frequency gain disappears.

Figure 19:
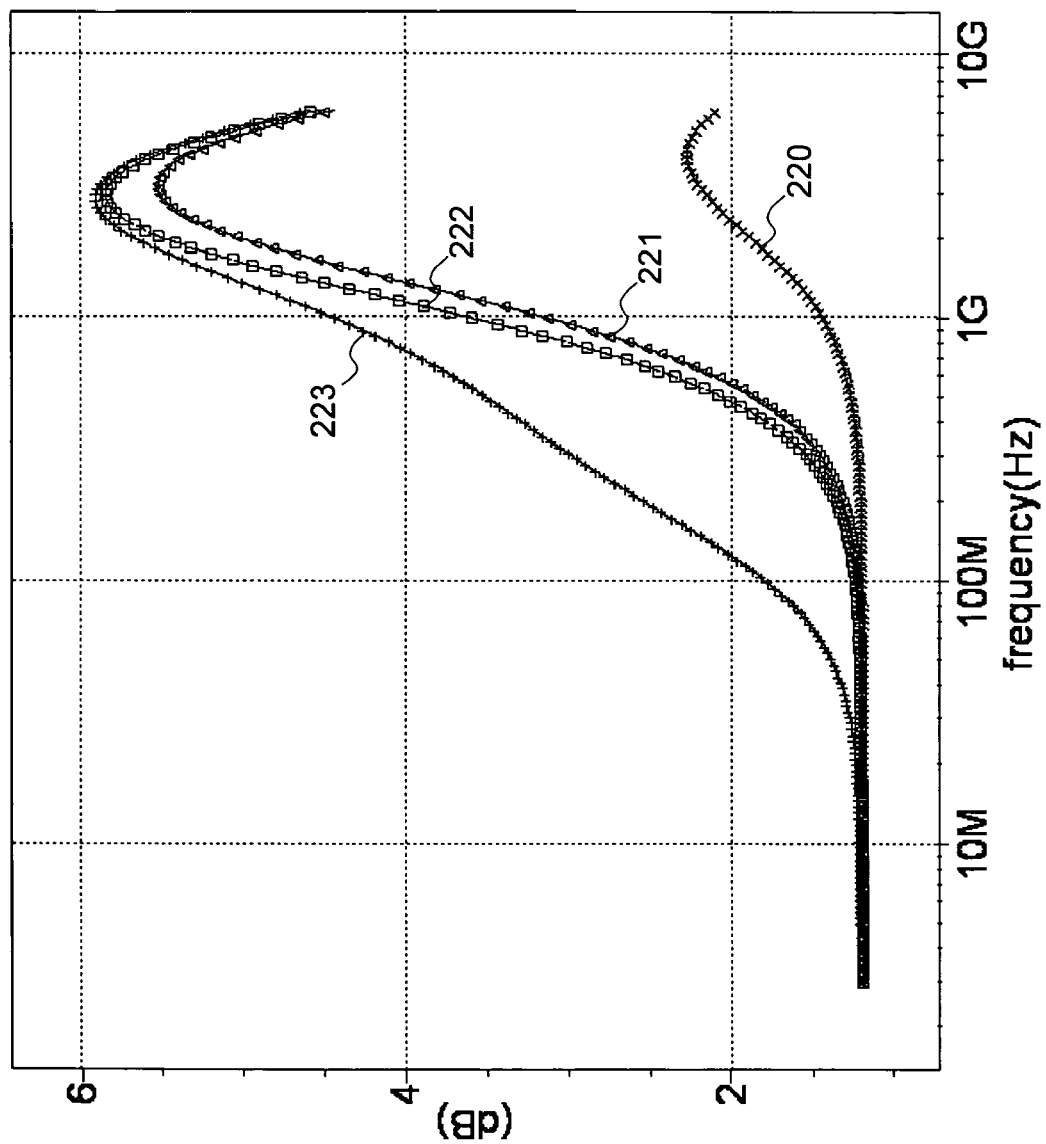
FIG. 19 shows several gain curves associated with amplifying compensation stages of FIG. 18a and FIG. 18b.

Curve 220 in FIG. 19 is the gain curve of triple-loop amplifying compensation stage 1000 whereby the voltage at the gain input is 1.2V, and the second and third control signals at the mid-frequency gain input 1014 and at the higher frequency gain input 1015 respectively are both 0 V. In this way, branches corresponding to the programmable and/or tuneable higher frequency gain function circuit 1050 and corresponding to the programmable and/or tuneable mid frequency gain function circuit 1051 are not active. The curve shows a small rise in gain for frequencies >1 GHz, but this is not harming good equalizer operation. Curve 222, is when the higher frequency gain branch becomes active, by bringing the third control signal on the higher frequency gain input 1015 to a positive value, e.g. 1.8V, and making the switching element in that branch, transistor M11, conductive. The capacitor C2 brings in a zero letting the gain rise strongly from 300-400 MHz onwards, until 2.4 GHz, at the maximum bandwidth of the stage.

Turning on the switching element in the branch corresponding to the programmable and/or tuneable mid-frequency gain function circuit, in the example given transistor M10, (by bringing the second control signal at mid-frequency gain input terminal 1014 to a positive value, e.g. 1.8V), deforms the gain curve to curve 223. Curve 223 starts rising earlier, from 40 MHz onwards, but rises less steep, until curve 223 comes back together with curve 222 at 1.5 GHz. Such a less steep rise in gain curve is needed in cases whereby a transmission channel has to be compensated having not such a steep loss curve. The latter is typically the case when skin-effect is dominating the loss curve, or when many causes of losses are at much higher frequencies (e.g. 10 GHz), each giving a tiny bit of loss at the 1 GHz level. Such accumulated large number of small amounts of loss may also form a loss tail with a less steep loss behaviour. The very steep curve 222 on the contrary, may rather serve for compensating dielectric losses in transmission channels or first order filtering losses like a bond-wire or a lossy connector, with an attenuation pole in the GHz range.

Figure 18B:
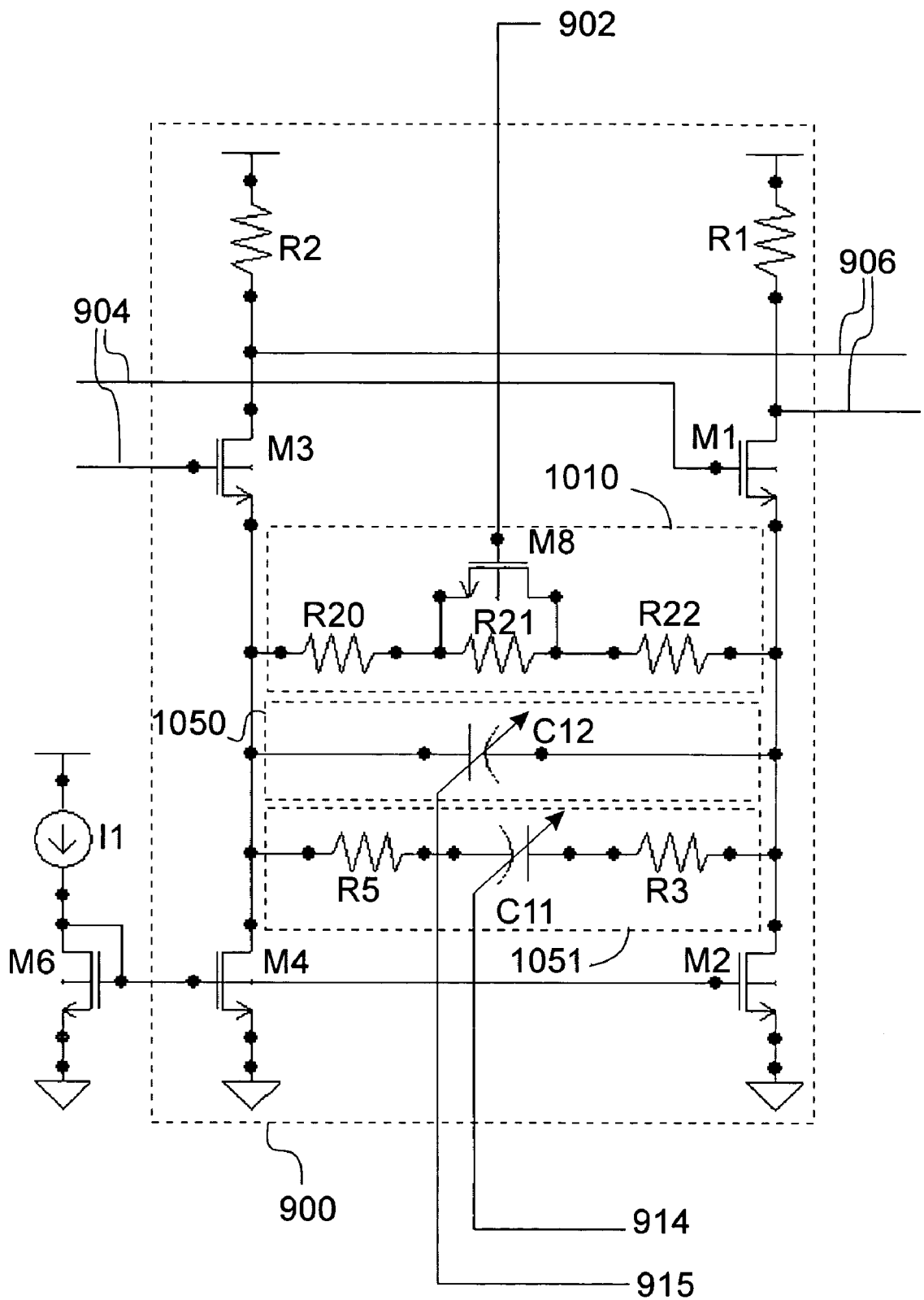
FIG. 18b shows an embodiment of an amplifying compensation stage with a first gain input for low frequency regulation, a second input terminal for mid-frequency gain regulation and a third input terminal for higher frequency gain regulation, the mid- and higher frequency gain regulation being by the use of varactors driven by the signals at the second and third input terminals.

FIG. 18b shows a similar amplifying compensation stage 900 with an input node 904 and an output node 906, which amplifying compensation stage 900 is based on varactors C12 and C11. The circuit 900 illustrated comprises a programmable and/or tuneable lower frequency gain function circuit 1010, by which the lower frequency gain can be adjusted via a first control signal on lower frequency gain input 902, a programmable and/or tuneable mid-frequency gain function circuit 1051, by which the mid-frequency gain can be adjusted via a second control signal on mid-frequency gain input 914, and a programmable and/or tuneable higher frequency gain function circuit 1050, by which the higher frequency gain can be adjusted via a third control signal on a higher frequency gain input 915. The higher frequency gain function circuit 1050 at least comprises a varactor C12, and the mid-frequency gain function circuit 1051 at least comprises a varactor C11. The varactors' limitations in dynamic range will make it difficult to fully switch off the mid- and higher frequency gain. When fully turned on, however, curve 223 can be reached as well (FIG. 19). Curve 222 is the curve with the mid-frequency turned off entirely (what is difficult to reach because C1 cannot be turned of completely). Curve 221 is whereby the value of the varactor C12 in the higher frequency gain function circuit 1050 is decreased from 50 to 40 fF, demonstrating the shift depending on the change of the capacitor's value.

Figure 20:
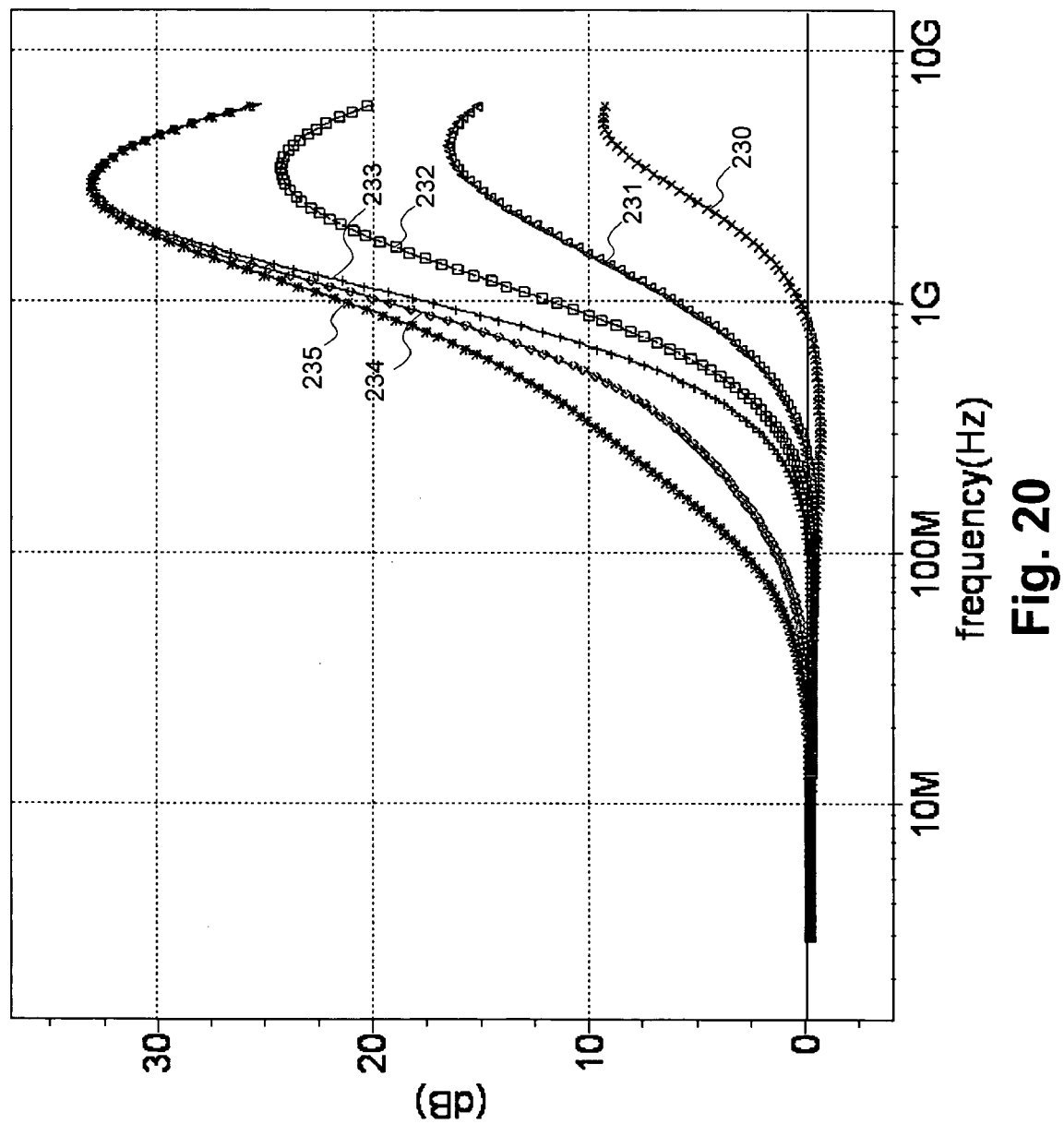

FIG. 20 shows some gain curves from a cascade of 6 triple loop amplifying compensation stages 1000. Curve 230 is when all mid and higher frequency gain terminals are at 0V, i.e. when only low frequency compensation is carried out. After switching ON the higher frequency gain function circuits 1050 of two stages 1000, by putting a positive voltage signal on the corresponding higher frequency gain input terminals 1015 (e.g. by connecting them to 1.8 V) curve 231 is obtained. When switching ON two extra higher frequency gain function circuits 1050 of two other stages 1000, curve 232 is obtained, and by having all 6 higher frequency gain function circuits 1050 turned ON, curve 233 is reached. Now the mid-frequency gain function circuits 1051 of two stages 1000 are switched ON, by putting a positive voltage control signal on the corresponding mid-frequency gain input terminals 1014, yielding curve 234, and finally with the mid-frequency gain function circuits 1051 of four stages 1000 switched ON, curve 235 is obtained. So from curve 230 to curve 233 only higher frequency gain function circuits 1050 have been turned ON, and from 234 to 235 mid-frequency gain function circuits 1051 have been turned ON as well, demonstrating full curve flexibility.

From simulations it can be learned that one may end up with gain curves that do not have a shape that would be a valid compensation curve for a transmission channel. This may happen when in a stage the mid-frequency gain function circuit 1051 is turned ON, while the higher frequency gain function circuit 1050 is turned OFF. In order to avoid this situation, it is preferred to work for both sets of switches, the switches M10 for the mid-frequency gain function circuits 1051 and the switches M11 for the higher frequency gain function circuits 1050, with a mechanism for sequentially turning on the switches, starting from the first amplifying compensation stage, closest to the input of the receiver. Further, by giving mid-frequency gain function circuit 1051 a heavier weight, in realistic circumstances there will always be at least the same number of higher frequency gain circuits 1050 turned ON as there will be mid-frequency gain circuits 1051 turned ON. The latter is achieved in simulations by choosing the value of resistors R5 and R3 in the mid-frequency gain function circuit 1051 at 4 kΩ instead of 8 kΩ. The capacitor C1 in the mid-frequency gain function circuit 1051 may have a larger value accordingly, however, for the simulations C1 was held to its 140 fF value. The remaining components have the same values as in stage compensating 800 for generating similar results, transistors M11 and M10 having same W/L as transistor M9.

Figure 21B:
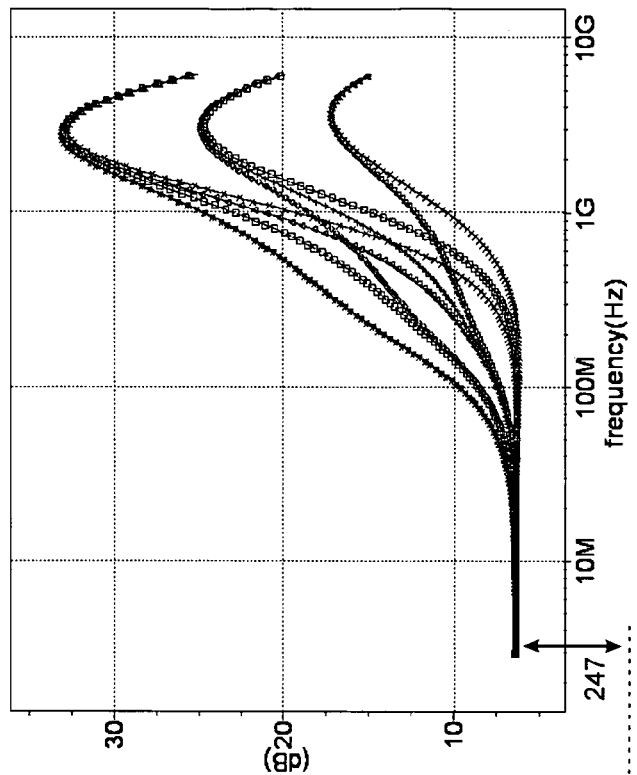
FIG. 21b illustrates the same as FIG. 21a, but for a different input gain voltage.
Figure 21A:
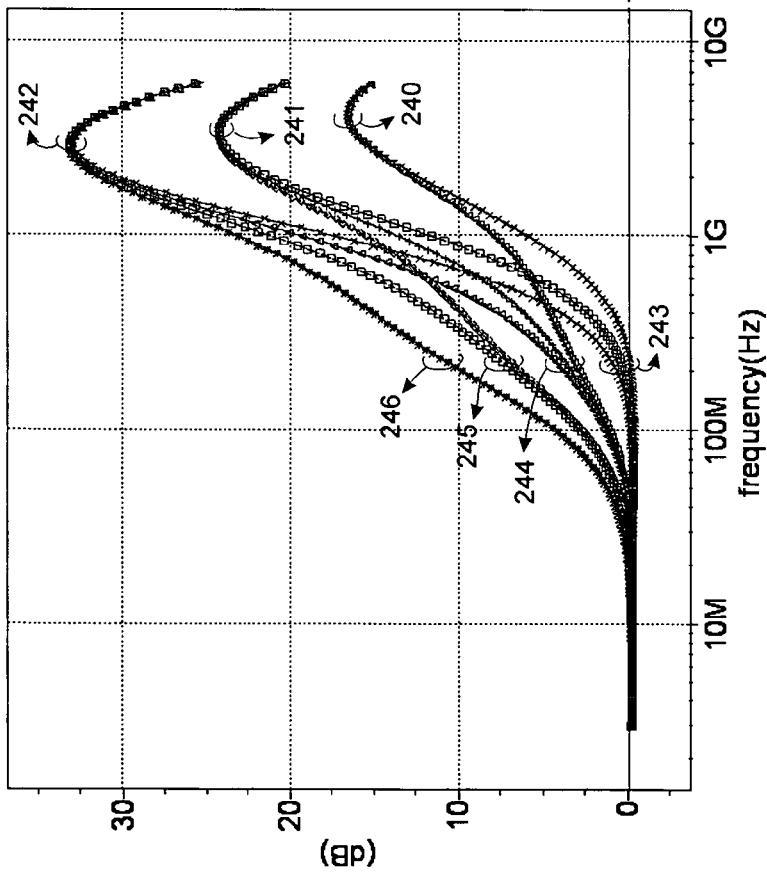
FIG. 21a shows several gain curves associated with a cascade of 6 amplifying gain stages in FIG. 18b.

FIGS. 21a and 21b show various conditions demonstrating also mid-frequency regulation for a smaller number of mid-frequency gain function circuits turned ON than high-frequency gain functions turned ON, and at different gain input voltages.

The curves in the group 240 have two higher frequency gain function circuits turned ON, group 241 has four higher frequency gain function circuits turned ON, and group 242 has all six higher frequency gain function circuits turned ON. Group 243 has all mid-frequency gain function circuits turned OFF, group 244 has two mid-frequency gain function circuits turned ON and group 245 has four mid-frequency gain function circuits turned ON and group 246 has all six mid-frequency gain function circuits turned ON. In FIG. 21a, the gain input voltage was 1.1V, and in FIG. 21b this voltage was raised to 1.5V giving a gain increase 247 at the low frequencies of about 7.5 dB.

Figure 22:
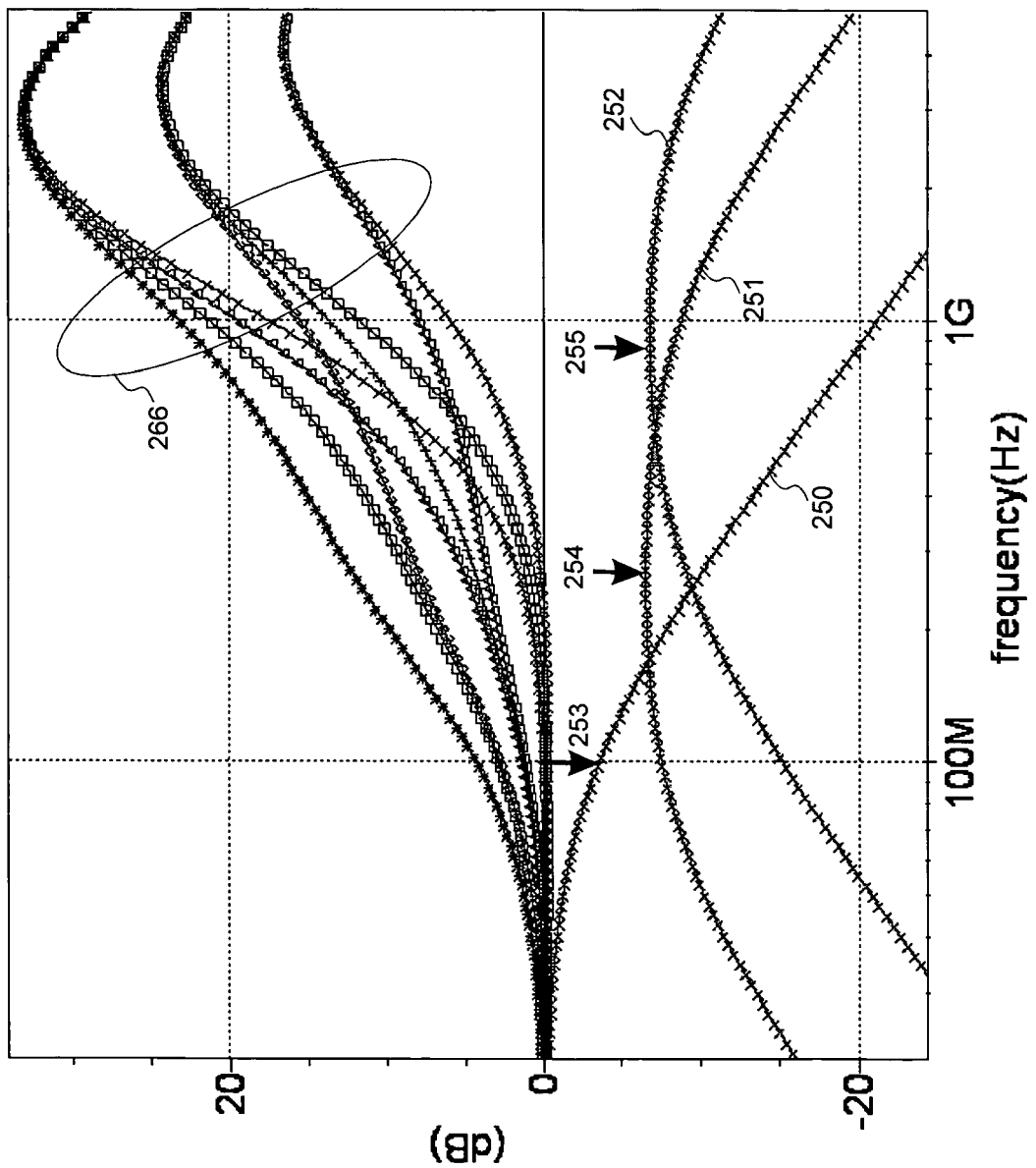
FIG. 22 shows the positioning of the low pass filter and the two band pass filters relative to the modulation of the gain curves.

Due to the flexibility of curves, it becomes now feasible to compensate a very large set of different situations, and in order to be able to reach this goal in a self-adaptive way, for this triple loop three filtering functions are defined in FIG. 22. Upper curves 266 are the same as the curves 240, 241, 242 from FIG. 21a.

The low pass filter curve 250 having a −3 dB point 253 at 100 MHz is for the low-frequency regulation loop having low pass filters 82 and 83 and rectifying comparator 87.

The pass band filter curve 251 with its maximum gain 254 at 250 MHz is for the mid-frequency regulation loop having band pass filters 89 and 90 and rectifying comparator 91.

The pass band filter curve 252 with its maximum gain 255 at 850 MHz is for the higher-frequency regulation loop having pass band filters 84 and 85 and rectifying comparator 86.

As can be seen on FIG. 22, each of the filter types has its pass frequencies mainly at the level for which its loop is intended to operate. The low-pass frequency measures the frequency contents below 100 MHz, the mid-frequency pass band curve 254 measures from 100 MHz onwards up to 600-700 MHz, and the higher frequency gain pass-band measures from 400 MHz up to 2.5 GHz. The gain curves 266 behave such that for each regulation parameter the curves respond maximally in their corresponding filter domain. This is necessary for achieving good and stable convergence of all loops together. In the simulations this good convergence is acknowledged under various conditions. It is further advised that the resistors in the filter and in the stages are of the same type. This is also advisable for the capacitors used. The advantage is that with process, voltage and temperature variations, the correspondence between frequencies in all loops remains valid. If for a certain application one encounters stability difficulties, one can still decide to use tricks known to a person skilled in the art to improve stability. One of them is to arrange very different time constants requiring much longer to convergence of the three loops; however, it may avoid instability.

Figure 23:
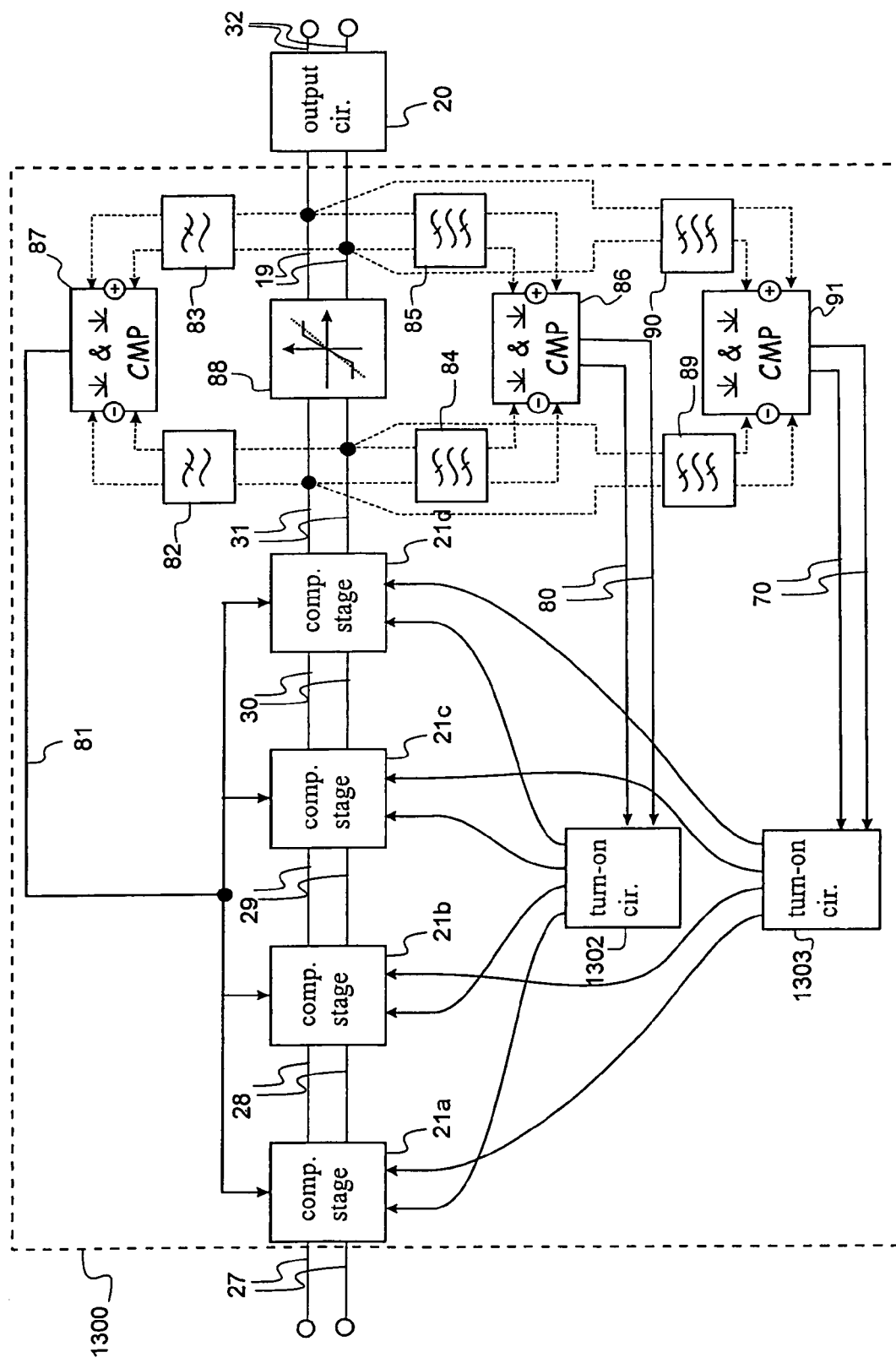
FIG. 23 shows a schematic representation of an adaptive equalizer having triple loop, according to an embodiment of the present invention.

FIG. 23 is a schematic representation of a triple loop auto-adaptive equalizer 1300. For the higher frequency gain there are the band-pass filters 84 and 85, the rectifying comparator 86, and the sequential turn-on circuit 1302 for sequentially turning ON higher frequency gain function circuits of subsequent amplifying compensation stages 21a, 21b, 21c, 21d. For the mid-frequency gain there are the band-pass filters 89 and 90, the rectifying comparator 91, and the sequential turn-on circuit 1303 for sequentially turning ON mid-frequency gain function circuits of subsequent amplifying compensation stages 21a, 21b, 21c, 21d. A signal 80, respectively 70, communicates to sequential turn-on circuit 1302, respectively 1303, to increase or decrease the higher frequency gain, respectively the mid-frequency gain.

Like in the dual loop configuration it is advised to target to a small overcompensation (instead of to the optimal compensation), in this case for both the mid-frequencies and the higher frequencies. The overcompensation only adds very little jitter in the resulting eye-diagram, leaving compensation margin in two directions. In any case one should avoid to ever give a few dB (or more) too little compensation, since this leads to severe jitter penalties. This overcompensation, if not generated automatically, can e.g. be provoked by including an offset in the corresponding comparator means, e.g. comparator 86 for the higher frequencies or comparator 91 for the mid frequencies.

An auto-adaptive equalizer specified for a pre-determined bit-rate and a maximum compensation level can, for a specified cable, compensate cable losses up to a pre-determined maximum cable length. The "auto-adaptive" specification means that the equalizer will automatically adapt its compensation level for shorter lengths than the maximum cable lengths. The better auto-adaptive cable equalizer will remain working correctly with lower bit-rates up to the same cable length. In that sense an equalizer according to embodiments of the present invention may be said to be a multi-rate equalizer. Alternatively, at the lower bit-rates extended reach may be provided, i.e. gain may be supported for longer cables than the maximum cable length at its maximum bit-rate. In general, equalizers can compensate a total loss of about 30 dB. For more loss compensation one typically runs into signal to noise ratio problems. The aim of a multi-rate equalizer according to the present invention can thus be to achieve this 30 dB compensation in a larger bit rate range.

Figure 24:
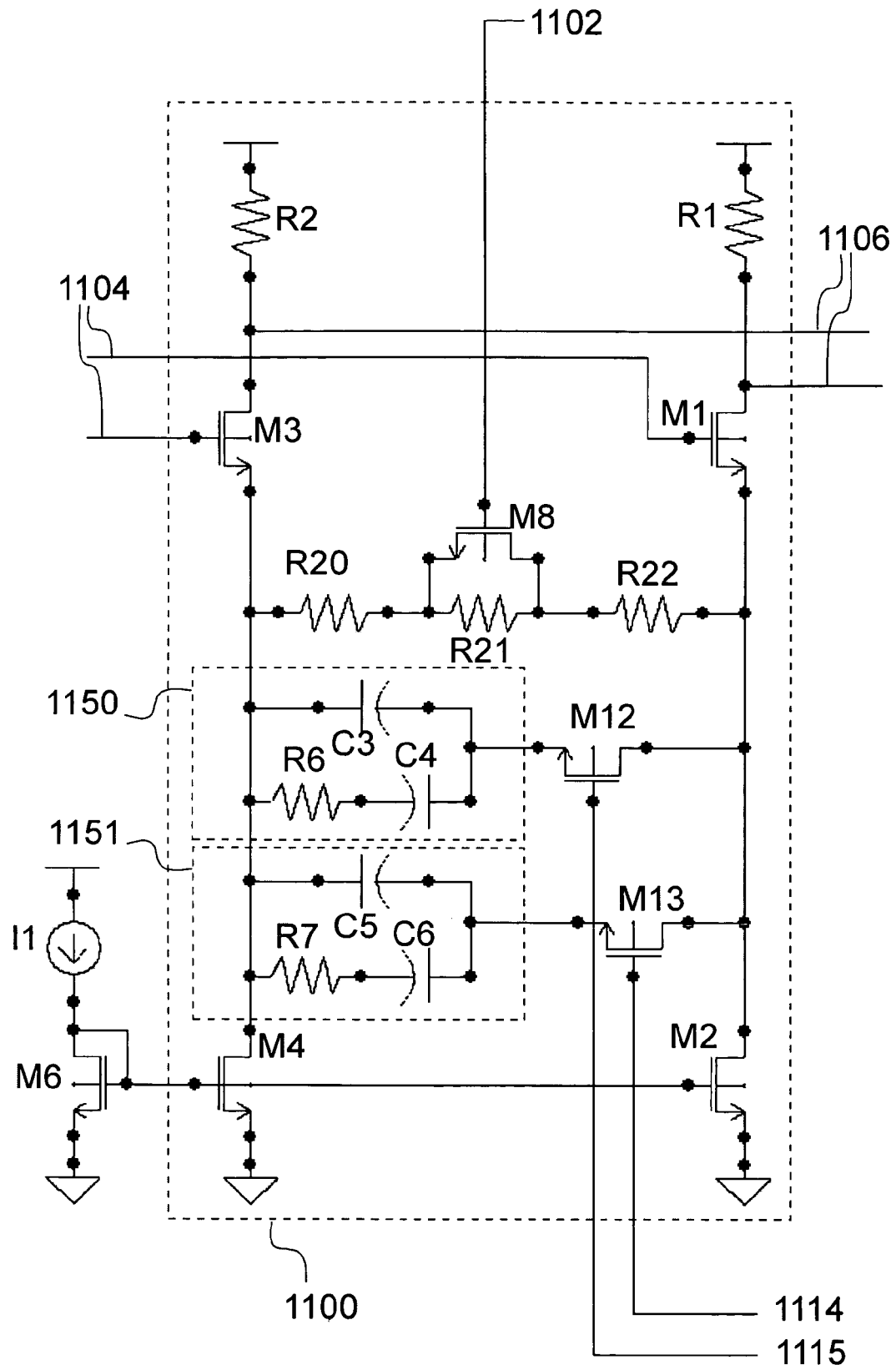
FIG. 24 shows an amplifying compensation stage that is adapted for multi-rate operation.

It will now be demonstrated how to achieve this for the bit rate range from 800 Mbps up to 4 Gbps using a somewhat modified triple loop approach. FIG. 24 shows the amplification compensation stage 1100 that is adapted for multi-rate operation. Like in some previous stages there is for compensation at the low frequencies, e.g. frequencies below 20 MHz a lower frequency gain input terminal 1102 onto which a first control signal can be put for controlling a lower frequency gain function circuit 1010. For the highest bit rate of 4 Gbps, compensation at the higher frequencies, e.g. frequencies between 100 MHz and 2.5 GHz may be done by a higher frequency gain function circuit 1150 that can be turned ON by a suitable control signal on the higher frequency gain input terminal 1115 and its associated switch, e.g. transistor M12. For the lower speeds, i.e. lower frequencies, a switch, e.g. transistor M13, controlled by a suitable control signal on mid-frequency gain input terminal 1114, can turn ON mid-frequency gain function circuit 1151, thus turning on additional gain at the middle frequencies, i.e. frequencies between 10 MHz and 1 GHz such that the bit-rates from 800 Mbps up to 4 Gbps may reach compensation up to at least +30 dB. Again, although not shown, a person skilled in the art can design, following an embodiment of the present invention, a multi-rate stage based on varactors.

Figure 25:
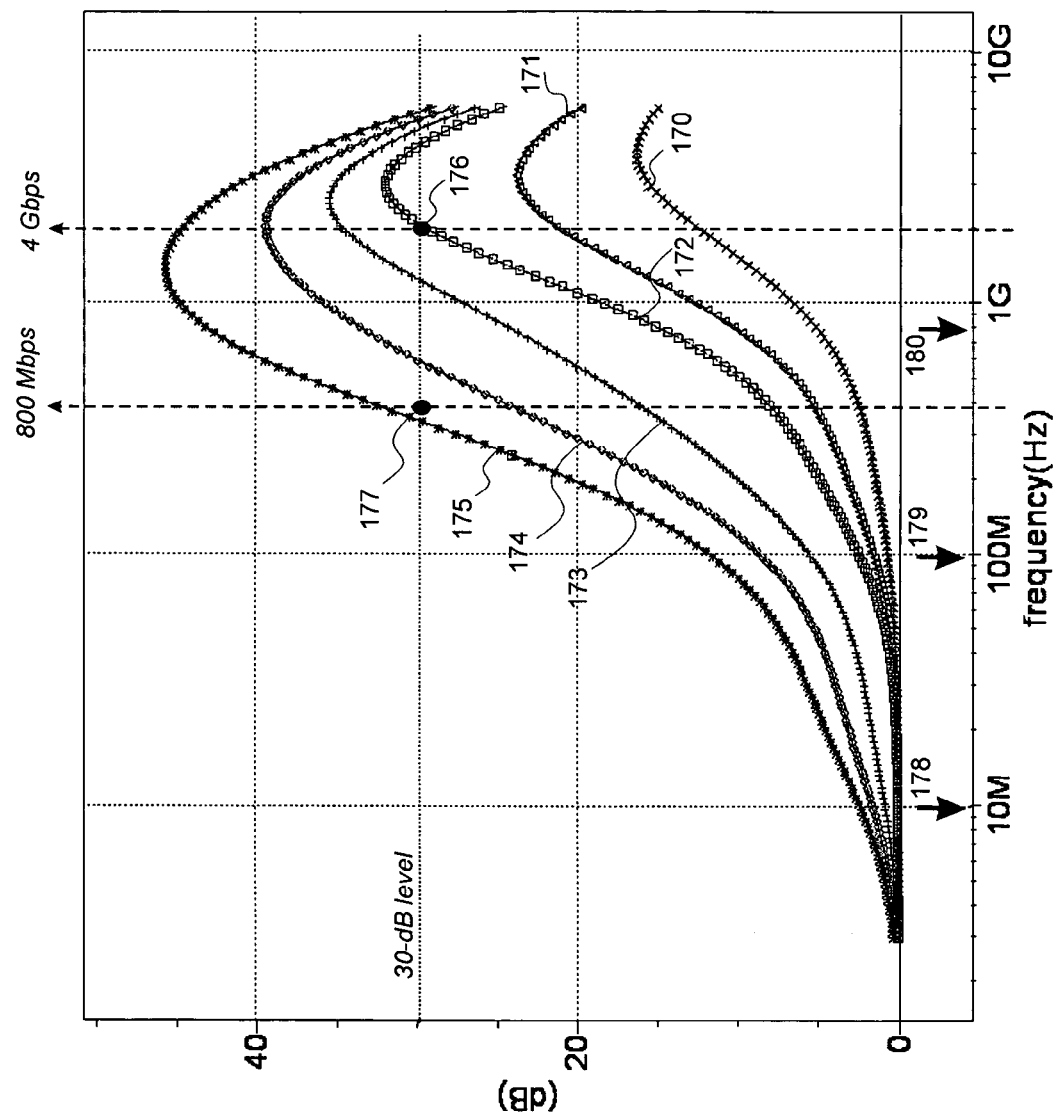
FIG. 25 shows a set of gain curves associated with a cascade of 6 amplifying gain stages as in FIG. 24.

FIG. 25 shows several gain curves for a cascade of six such amplifying compensation stages 1100, each having an input node 1104 and an output node 1106. Hereby the voltage at the lower frequency gain input terminal 1102 was chosen to give 0 dB gain at lower frequencies. Curve 170 represents the gain with two stages having the higher frequency gain function circuit 1150 turned ON. Curve 171 has the higher frequency gain function circuit 1150 turned ON in four stages, and curve 172 has the higher frequency gain function circuit 1150 turned ON in all six stages. These curves 170, 171 and 172 are well shaped for 4 Gbps equalization. The gain increases up to beyond 2 GHz, more particularly up to 2.8 GHz. 30 dB compensation at 2 GHz is reached at position 176 on curve 172. The sequentially switching ON of stages may be in a sequence from the first amplifying compensation stage encountered by the signal coming in, to the last amplifying compensation stage in the cascade of stages. Alternatively, amplifying compensation stages may be switched on in a different order.

Curves 173, 174, 175 are when additionally two, respectively four and six mid-frequency gain function circuits 1151 are turned ON. These extra gain curves are for support of lower bit-rates down to at least 800 Mbps (400 MHz). Position 177, with 30 dB compensation at 400 MHz is surpassed by the latter curve 175, showing that 30 dB compensation can be reached at the lower bit rate of 800 Mbps.

The components of the higher frequency gain function circuit 1150, for the embodiment illustrated capacitors C3 and C4 and resistor R6, can be determined in the same way as in the dual loop stage 800 capacitors C1, C2, and resistors R5 and R3 were determined, using a target gain curve 116 derived from a loss measurement from the target cable. When calculating the same values C3=100 fF, C4=140 fF and R6 equaling 16 kΩ are obtained. R6 equals the series connection of R3 and R5. In a similar way the components of the mid-frequency gain function circuit 1151, in the embodiment illustrated capacitors C5 and C6 and resistor R7, can be derived. Since it is the intention to operate well at 800 Mbps, a loss curve can be measured, a target gain curve made, and curve 175 (FIG. 25) can be fit onto it. Hereby, the following has to be taken into account: when working at lower bit-rates, all higher frequency gain stages will typically be turned ON by their higher frequency gain loop. This loop will always try to increase the higher frequencies in order to match the higher frequencies that are present at the output of the limiting amplifier 88. However this loop will go out of its regulation range, turning all higher frequency gain inputs ON. This does not form a problem when this is taken into consideration when fitting the values of the components C5, C6 and R7 of the mid-frequency gain function circuit. It also avoids that there may be a stage that has only its mid-frequency gain terminal turned ON, without having its higher frequency terminal being ON, giving unwanted curvatures. For this triple loop example a lowpass filter with −3 dB point 178 at 10 MHz, a mid frequency pass band filter with maximum gain point 179 at 100 MHz, and a higher frequency pass band filter with maximum gain 180 at 750 MHz gives good triple convergence. In an alternative embodiment, for the higher frequency gain instead of pass-band filters high-pass filters may be used having the advantage that the signal at the inputs of comparator 86 may have a larger amplitude, facilitating comparison. When operating at high speeds, however, it should not be neglected that a mere high pass filter represents heavier loading at the node to which it is connected In the above described embodiments, each of the amplifying compensation stages has an amplification versus frequency behaviour that is always increasing with increasing frequency at least for the last decade of frequency up to the upper data frequency, except when the stage's higher frequency gain is turned-off. Furthermore, according to the present invention, the devices operate in non-saturation mode, within the operational range, for all data-nodes including output nodes in all stages, even in the envisaged overcompensation situation whereby acceptable additional jitter is tolerated.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. An equalizer filter for compensating a received distorted signal for frequency dependent signal modifications introduced by a transmission channel, the received signal having an amplitude, said filter comprising at least one amplifying compensation stage having a gain and a saturation level, the gain being monotonically rising for at least a last decade in frequency below an upper data frequency of the received signal, and gain control means for controlling the gain of the amplifying compensation stage, such that the amplitude of the received signal amplified in the at least one amplifying compensation stage remains below the saturation level of the amplifying compensation stage, wherein said equalizer filter further comprises a comparator means for comparing differential outputs of a first and a second filter coupled to the output node of the last amplifying compensation stage and to the output node of the equalizer filter, wherein the first and second filters are pass-band filters and wherein the comparator means is adapted for generating a comparator signal for adjusting the higher frequency or mid-frequency gain of the at least one amplifying compensation stages.

2. An equalizer filter for compensating a received distorted signal for frequency dependent signal modifications introduced by a transmission channel, the received signal having an amplitude, said filter comprising at least one amplifying compensation stage having a gain and a saturation level, the gain being monotonically rising for at least a last decade in frequency below an upper data frequency of the received signal, and gain control means for controlling the gain of the amplifying compensation stage, such that the amplitude of the received signal amplified in the at least one amplifying compensation stage remains below the saturation level of the amplifying compensation stage, wherein said equalizer filter further comprises a comparator means for comparing differential outputs of a first and a second filter coupled to the output node of the last amplifying compensation stage and to the output node of the equalizer filter, wherein the first and second filters are high-pass filters and wherein the comparator means is adapted for generating a comparator signal for adjusting the higher frequency gain of the at least one amplifying compensation stages.

3. An equalizer system for compensating a received distorted signal for frequency dependent signal modifications introduced by a transmission channel, the received signal having an amplitude and said equalizer system comprising an equalizer filter, said equalizer filter including at least one amplifying compensation stage having a gain and a saturation level, the gain being monotonically rising for at least a last decade in frequency below an upper data frequency of the received signal, and gain control means for controlling the gain of the amplifying compensation stage, such that the amplitude of the received signal amplified in the at least one amplifying compensation stage remains below the saturation level of the amplifying compensation stage, wherein said equalizer filter further comprises a comparator means for comparing differential outputs of a first and a second filter coupled to the output node of the last amplifying compensation stage and to the output node of the equalizer filter, wherein the first and second filters are pass-band filters and wherein the comparator means is adapted for generating a comparator signal for adjusting the higher frequency or mid-frequency gain of the at least one amplifying compensation stages.

4. An method for compensating a received distorted signal for frequency dependent signal modifications introduced by a transmission channel, the signal having an amplitude, said method comprising receiving a distorted signal, compensating said distorted signal, and outputting a compensated signal, wherein the step of compensating said distorted signal comprises providing a gain which is monotonically rising for at least a last decade in frequency below an upper data frequency of the received signal, the gain being adapted so as to keep the amplitude of the signal below a saturation level of at least one amplifying compensation stage and amplifying the received signal in the at least one amplifying compensation stage using the provided gain, the compensated signal being output at an output node of an equalizer filter, the method further comprising comparing differential outputs of a first signal on an output node of the last amplifying compensation stage and of a second signal on the output node of the equalizer filter, generating a comparison signal, and using the comparison signal in adjusting the higher frequency or the mid-frequency gain of the at least one amplifying compensation stage.

* * * * *